US012442814B2

(12) United States Patent
Gill et al.

(10) Patent No.: US 12,442,814 B2
(45) Date of Patent: Oct. 14, 2025

(54) BLOOD COAGULOMETER WITH DISCRETE INDICATOR AND METHOD

(71) Applicant: THE BOARD OF REGENTS OF THE UNIVERSITY OF TEXAS SYSTEM, Austin, TX (US)

(72) Inventors: Brijesh S. Gill, Houston, TX (US); Kevin R. Aroom, Houston, TX (US); Charles S. Cox, Jr., Houston, TX (US); Tushar Sharma, Houston, TX (US)

(73) Assignee: THE BOARD OF REGENTS OF THE UNIVERSITY OF TEXAS SYSTEM, Austin, TX (US)

(*) Notice: Subject to any disclaimer, the term of this patent is extended or adjusted under 35 U.S.C. 154(b) by 1281 days.

(21) Appl. No.: 17/054,957

(22) PCT Filed: May 13, 2019

(86) PCT No.: PCT/US2019/032010
§ 371 (c)(1),
(2) Date: Nov. 12, 2020

(87) PCT Pub. No.: WO2019/222096
PCT Pub. Date: Nov. 21, 2019

(65) Prior Publication Data
US 2021/0208129 A1  Jul. 8, 2021

Related U.S. Application Data

(60) Provisional application No. 62/671,238, filed on May 14, 2018.

(51) Int. Cl.
*G01N 33/49* (2006.01)
*B01L 3/00* (2006.01)

(52) U.S. Cl.
CPC ...... *G01N 33/4905* (2013.01); *B01L 3/50273* (2013.01); *B01L 3/502753* (2013.01);
(Continued)

(58) Field of Classification Search
None
See application file for complete search history.

(56) References Cited

U.S. PATENT DOCUMENTS 5,154,082 A * 10/1992 Mintz ................ G01N 33/4905
73/64.41
2019/0162641 A1   5/2019 Yu et al.

FOREIGN PATENT DOCUMENTS

EP       3112872 A1 * 1/2017 ......... G01N 33/4905
WO    WO 2017/139384      8/2017
(Continued)

OTHER PUBLICATIONS

International Search Report and Written Opinion issued in PCT/US2019/032010, dated Nov. 28, 2019.

*Primary Examiner* — Matthew D Krcha
(74) *Attorney, Agent, or Firm* — pH IP Law

(57) ABSTRACT

An apparatus for determining the capacity of a blood sample to clot, the apparatus having a body with a cavity thereon to receive the blood sample, a displacement member movably received on the body and movable from a first position to a second position, a spring element for imparting a retaining force against movement of the displacement member from the first position, and a discrete indicator for generating a signal when the displacement member is moved to the second position. The coagulation and contraction of the blood sample as it clots adheres to and moves the displacement member from the first position towards the second position against the retaining force of the spring element. The indicator may include a mechanical switch, an exothermic chemical switch, a chemiluminescent chemical switch, (Continued)

a segmented optical pathway, an electrical switch, a field effect transistor switch or a Hall effect magnetic switch.

17 Claims, 12 Drawing Sheets

(52) U.S. Cl.
CPC ............... *B01L 2300/0654* (2013.01); *B01L 2300/0663* (2013.01); *B01L 2300/0877* (2013.01)

(56) References Cited

FOREIGN PATENT DOCUMENTS

| | | | |
|---|---|---|---|
| WO | WO 2017/155736 | 9/2017 | |
| WO | WO-2017152292 A1 * | 9/2017 | ........... A61B 5/0051 |
| WO | WO-2017155736 A1 * | 9/2017 | ............... G01L 1/18 |
| WO | WO 2017/186183 | 11/2017 | |

* cited by examiner

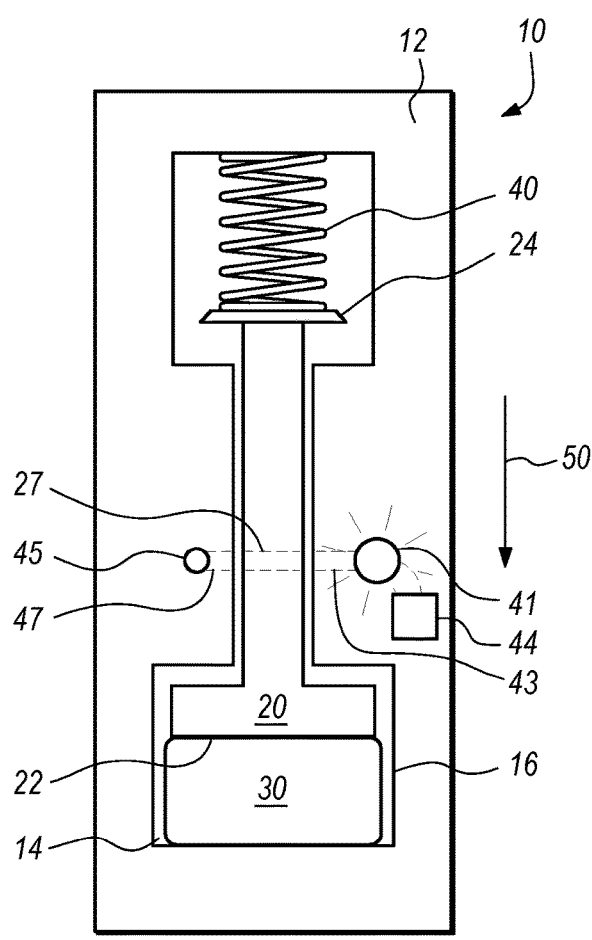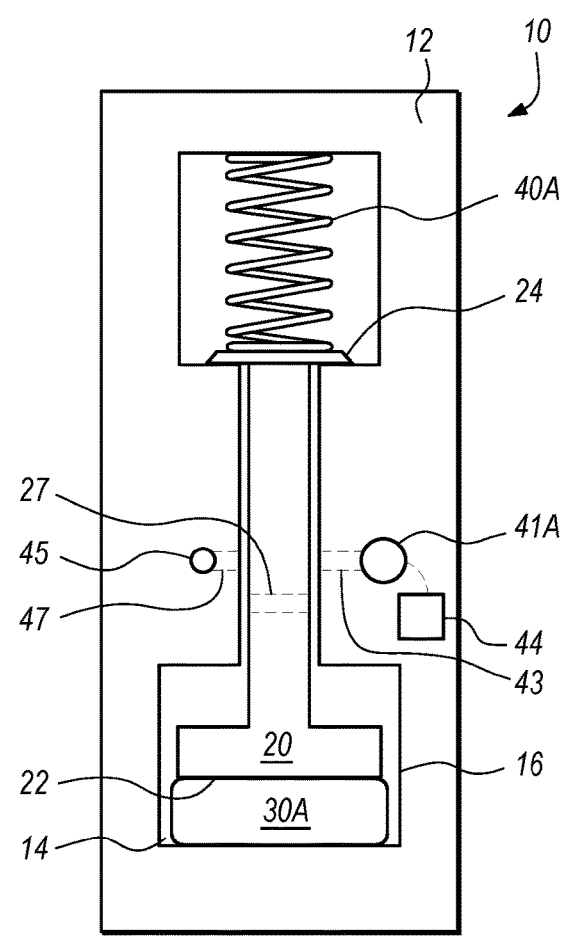
FIG. 20     FIG. 21

BLOOD COAGULOMETER WITH DISCRETE INDICATOR AND METHOD

STATEMENT OF RELATED APPLICATIONS

This international application depends from and claims priority to PCT/US2019/032010 entitled Blood Coagulometer with Discrete Indicator and Method filed on May 13, 2019, which depends from and claims priority to U.S. Provisional Application No. 62/671,238 filed on May 14, 2018.

FIELD OF THE INVENTION

This application relates to an apparatus and a method for determining whether a sample of blood introduced into the apparatus has a predetermined capacity to clot that is required to activate an indicator of the apparatus.

BACKGROUND OF THE INVENTION

The process of blood coagulation (thrombogenesis) results in blood clotting and involves a coagulation cascade of many factors most of which are enzymes which cleave downstream proteins in the coagulation process. The ability to maintain proper clotting balance is critical. Disorders that effect coagulation of blood can lead to uncontrolled bleeding (hemorrhage) or uncontrolled clotting (thrombosis) that can prevent blood flow to critical organs such as, for example, the heart or the brain. A discussion of the mechanics of blood coagulation and contraction can be found in U.S. Pat. No. 9,753,024, which is incorporated by reference in its entirety.

Many tests are available to evaluate the function of the clotting system in mammals. Currently, one of the most informative methods of testing the efficiency of the clotting system is thromboelastography ("TEG"). For a recent review see Trapani, L., "Thromboelastography: Current Applications, Future Directions," *Open Journal of Anesthesiology*, January 2013. TEG, in its original format, uses a sample of blood that is placed in a cuvette and rotated about a thin wire (wetted member) that measures clot formation, clot strength and other parameters. In an alternate form, known as rotational thromboelastometry (ROTEM), the sample remains stationary, but the shaft includes a sensor pin to measure various parameters as the shaft rotates within the well in which the blood sample is disposed. Conventional TEG devices are large and expensive, which limits their availability. The basic mechanism and design of conventional TEG devices is not conducive to miniaturization.

The presently described methods and devices provide a novel mechanism and device to measure blood coagulation parameters which represents a micro-electromechanical system (MEMS). The miniaturization possible with this design allows the device to be constructed as a single-use sealed and disposable with or without all electronics built into the package. This offers many advantages, including but not limited to, a reduction in the volume of the blood sample required, the expense of the test and allows bedside (point of care) application and enhances both safety and convenience.

SUMMARY OF THE PRESENT INVENTION

The present invention relates to an apparatus to an apparatus having an indicator for providing a discrete indication of whether a blood sample introduced into the apparatus has a predetermined capacity to clot. If the blood sample has the predetermined capacity to clot, the indicator activates a signal generator to alert the user of the apparatus. If the blood sample does not have the predetermined capacity to clot, the indicator does not activate the signal generator and no signal is provided to the user. In various embodiments, the indicator of an apparatus of the present invention may include a mechanical switch, an electrical switch, a segmented optical pathway switch, an electrochemical switch, an exothermic chemical switch, a field effect transistor switch, a Hall effect sensor switch or a visibly deformable member.

The term "signal generator," as that term is used herein, means a signal that is generated and that is detectable by the user of the apparatus. The signal that is generated may be either a positive signal, meaning that the generated signal may be the activation of an optically detectable signal (such as, for example, a light or a change in color of a material), an audibly detectable signal (such as, for example, a beep, chirp, tone or click), a tactile signal (such as, for example, a vibration or change in temperature of a material) or, alternately, the signal that is generated may be a negative signal, meaning that the generated signal may be the deactivation of an activated optically detectable signal, an activated audibly detectable signal or an activated tactile signal. Some embodiments of the present invention utilizing negative signal generation may further include a switch used to close a circuit to activate a signal prior to the introduction of a sample of blood into the apparatus to conserve battery life until the apparatus is utilized.

Embodiments of the apparatus of the present invention are adapted for miniaturization to provide for ease of transport and use in the field where first responders, medics and other emergency technicians, clinicians and doctors can quickly determine whether a patient's blood has a predetermined capacity to clot. For example, but not by way of limitation, traumatic head injuries can result in bleeding within the brain, and medications can be administered to limit or impair such bleeding. However, an emergency responder may need to know whether the patient's blood has or lacks a certain capacity to clot prior to administering such medications, as an excessive lack of capacity to clot can result in other unwanted medical conditions. Embodiments of the present invention can be used to quickly determine whether a patient can tolerate the medication prior the medication being given to the patient. As another example, a clinician may need to determine whether a patient can be successfully treated with aspirin or some other blood thinning agent to inhibit unwanted clotting of the blood. Such medications can be used to treat certain heart conditions and heart attacks. Alternately, a clinician may need to determine whether the clotting capacity of the blood of a patient that has been treated with aspirin or another blood thinner is within a desired range prior to allowing the patient to continue taking the aspirin or other blood thinner or prior to performing a medical procedure.

Embodiments of the apparatus of the present invention can be made with varying components to enable a clinician to select an embodiment with components that will reveal a certain level of blood clotting capacity. A given patient's blood may generate a signal when tested using one embodiment of the apparatus of the present invention while that same patient's blood would not generate a signal when tested using another embodiment of the apparatus of the present invention. Components of embodiments of the apparatus of the present invention can be correlated to specific capacities of blood to clot, and users of the apparatus can select that embodiment that will provide confirmation of the presence or lack of a clotting capacity made the subject of the user's investigation.

One embodiment of the apparatus comprises a body having a cavity with a wall to receive a sample of blood obtained from a patient for testing, a displacement member movably received on the body, the displacement member movable through a distance on the body from a first position to a second position, the displacement member having a wetted portion thereon forming a wall portion that, together with the wall of the cavity, surrounds a blood sample introduced into the cavity, a spring element connected intermediate the displacement member and the body to bias the displacement member against movement from the first position and an indicator having a signal generator, a first portion on the body and a second portion on the displacement member, the second portion of the indicator being at least one of engaged with and aligned with the first portion of the indicator with the displacement member in the second position to produce a signal from the signal generator indicating movement of the displacement member to the second position wherein the introduction of the blood sample into the cavity of the body causes the blood sample to clot and to adhere to the wetted portion of the displacement member as it contracts within the cavity thereby resulting in displacement of the displacement member towards the second position and wherein the at least one of engagement and alignment of the second portion of the indicator on the displacement member with the first portion of the indicator on the body produces a signal indicating a condition of the blood sample.

The signal generator in embodiments of the apparatus of the present invention may produce a variety of signals, or multiple signals, including, but not limited to, a visually detectable signal such as a light such as a light emitting diode (LED), a liquid crystal display or a change in the color of a material, a tactile signal such as a brief vibration, or an audibly detectable signal such as a beeping or chirping sound upon the second portion of the indicator being at least one of engaged with and aligned with the first portion of the indicator with the displacement member in the second position. A visually detectable signal of the apparatus may include a thermally sensitive material that changes in color upon exposure to a change in temperature or in response to exposure to a chemical agent. While the visually detectable signal could also be a fluorescent or an incandescent light, these generally require greater electrical current. It will be understood that the miniaturization of the apparatus is enhanced by the use of a power source (battery or photovoltaic cell) and a signal generator (to produce a visually detectable, a tactile or an audibly detectable signal) that is small and compact in size and light in weight.

The spring constant of the spring element disposed intermediate the displacement member and the body of embodiments of the apparatus of the present invention, and the distance over which the displacement member moves from the first position to the second position, can together be selected to require a known amount of work to be imparted to the displacement member by the clotting blood sample for the displacement member to be moved to the second position and the known amount of work can be correlated to a predetermined clotting capacity of the blood sample introduced into the cavity.

One embodiment of the apparatus of the present invention may comprise a battery or a photovoltaic cell to supply electrical current to other components of the apparatus such as, for example, a signal generator that produces one of a visually detectable signal, a tactile signal and an audibly detectable signal. For example, a first portion of the indicator on the body may include an open electrical circuit with the battery or the photovoltaic cell coupled in series with the signal generator, the open electrical circuit having a gap therein proximal to the displacement member, wherein upon movement to the second position relative to the body, a conductive second portion of the indicator on the displacement member may conductively engage the first portion of the indicator on the body to bridge and close the gap in the open electrical circuit. In this manner, the movement of the displacement member, and the conductive second portion of the indicator thereon, such movement resulting from the clotting and contraction of the blood sample, can be used to engage the conductive second portion of the indicator with the first portion of the indicator on the body of the apparatus complete the electrical circuit and enable electrical current to be delivered from the battery or the photovoltaic cell to the signal generator to activate the signal generator.

Another embodiment of the apparatus of the present invention includes an optical switch. More specifically, an apparatus of the present invention may have a first portion of the indicator that includes an optical pathway first segment on the body of the apparatus, and the second portion of the indicator on the displacement member may include an optical pathway second segment wherein alignment of the first portion of the indicator with the second portion of the indicator provides an optical pathway to transmit a visually detectable light signal from the optical pathway first segment to the aligned optical pathway second segment or from the optical pathway second segment to the aligned optical pathway first segment. Optionally, the optical pathway first segment and/or the optical pathway second segment comprises an optically conductive medium such as, for example, but not by way of limitation, one or more optical transmission fibers, one or more photonic crystal waveguides, one or more variable diffraction gratings or glass. It will be understood that materials that scatter and/or reflect light can be used to promote transmission of light from one optical pathway segment to an adjacent and aligned optical pathway segment to enable these structures to be used as a position indicator.

One embodiment of the apparatus of the present invention includes a channel on the body having a first wall and a second wall opposite the first wall, with the displacement member being movably received therebetween. While a channel is not necessary for movably receiving the displacement member on the body, it can be used and/or integrated with indicators for producing a signal to indicate that the displacement member has moved to a predetermined position on the body.

For example, in another embodiment of the apparatus of the present invention that includes an optical switch for signaling when the displacement member has been moved by the coagulating and contracting blood sample to a predetermined second position on the body, the first portion of the indicator may include a body optical pathway first segment in the first wall of the channel on the body and an aligned body optical pathway second segment in the second wall of the channel, with the body optical pathway second segment being aligned with the body optical pathway first segment. The second portion of the indicator may include a displacement member optical pathway segment in the displacement member that is movably received on the body intermediate the first wall and the second wall of the channel. The displacement member optical pathway segment is not aligned with the body optical pathway first segment and the body optical pathway second segment when the displacement member is in the first position. However, upon coagulation and contraction of the blood sample introduced into the cavity on the body, the displacement member may be moved to the second position and the displacement member optical pathway segment aligns with the body optical pathway first segment and the body optical pathway second segment to provide a segmented optical pathway through which a light signal can be transmitted from a light source on the body on a first side of the channel through the segmented optical pathway to a signal generator in optical communication with the body optical pathway second segment. Again, light scattering and/reflecting materials can be included in the segments of the segmented optical pathway to promote light transmission.

In another example of an embodiment of the apparatus of the present invention having a channel on the body to movably receive the displacement member, the first portion of the indicator includes a recess in a wall of the channel on the body and the second portion of the indicator includes a recess in the displacement member. The recess on the displacement member of the apparatus is not aligned with the recess in the wall of the channel on the body with the displacement member in the first position. The apparatus further includes a push member received within the recess on the displacement member and a spring element disposed intermediate the push member and the displacement member to bias the push member against the wall of the channel on the body with the displacement member in the first position. Upon coagulation and contraction of the blood sample introduced into the cavity on the body, the displacement member may be moved to the second position and the recess on the displacement member may align with the recess in the wall of the channel on the body. Upon alignment of the recesses, the push member is displaced by the spring element from the recess on the displacement member and into the aligned recess on the body. In one embodiment, the push member may include one or more rolling elements to reduce frictional resistance to movement of the displacement member within the channel of the body. In another embodiment, the push member and the spring element that biases the push member may reside within the recess on the body and the recess on the displacement member may be empty so that, upon alignment of the recesses by movement of the displacement member to the second position, the push member may be pushed out of the recess on the body and into the recess on the displacement member. Either arrangement provides a visually detectable signal for alerting the user to the clotting condition of the blood sample.

In another embodiment of the apparatus of the present invention having a chemical switch, the first portion of the indicator on the body includes a first chemical agent and the second portion of the indicator on the body includes a second chemical agent that is reactive with the first chemical agent. The first chemical agent on the body is spaced apart from the second chemical agent on the displacement member with the displacement member in the first position on the body. Upon coagulation and contraction of the blood sample introduced into the cavity on the body, the displacement member may be moved to the second position and the first chemical agent may engage the second chemical agent to produce an exothermic reaction or a chemiluminescent reaction. A chemiluminescent reaction may provide a visually detectable signal to the user that the clotting condition of the blood is sufficient to move the displacement member to the second position. Where the apparatus produces an exothermic reaction, a heat-sensitive material that changes color as it changes temperature may be disposed on either or both of the displacement member and the body proximal to the exothermic reaction to provide the visually detectable signal. It will be understood that the first chemical agent and the second chemical agent are selected for compatibility with the material from which the displacement member and the body are made. In one embodiment, one or both of the first chemical agent and the second chemical agent are in a gel form to provide for improved contact with the other chemical agent to promote the exothermic reaction and the change in color of the heat-sensitive material.

Another embodiment of the apparatus of the present invention comprise a Hall effect sensor. More specifically, the apparatus comprises a body having a cavity to receive a sample of blood obtained from a patient for testing and a displacement member movably received on the body. The body has a Hall effect sensor that produces a signal in response to a magnetic field. The displacement member includes a magnet that moves with the displacement member through a distance on the body from a first position, in which the magnet is distal to the Hall effect sensor, to a second position to dispose the magnet proximal to the Hall effect sensor. The displacement member has a wetted portion thereon that forms a wall portion that, together with the wall of the cavity, surrounds a blood sample introduced into the cavity. The apparatus further includes a spring element connected intermediate the displacement member and the body to bias the displacement member against movement from the first position to the second position. Upon coagulation and contraction of the blood sample introduced into the cavity on the body, the displacement member may be moved to the second position and the magnet on the displacement member may be moved to a position proximal to the Hall effect sensor to produce a signal to the user that the blood sample has a clotting condition indicated by the embodiment of the apparatus.

Another embodiment of the apparatus of the present invention comprises a body having a cavity with a wall to receive a sample of blood obtained from a patient for testing and a field effect transistor as a position sensor. Specifically, the body includes a source dopant, a drain dopant spaced apart from the source dopant, a reverse polarity dopant disposed intermediate the source dopant and the drain dopant, a source metal electrode adjacent the source dopant, a drain metal electrode adjacent to the drain dopant, and an oxide/dielectric member disposed intermediate the source dopant and the drain dopant and proximal to the reverse polarity dopant. The body of the apparatus further includes a conductive circuit coupled in series between the source dopant and the drain dopant with a battery and a signal generator disposed within the circuit therebetween. The apparatus further includes a displacement member movably received on the body, the displacement member having a gate movable with the displacement member through a distance on the body from a first position to a second position. The displacement member includes a wetted portion thereon forming a wall portion that, together with the wall of the cavity, surrounds a blood sample introduced into the cavity. The apparatus further includes a spring element connected intermediate the displacement member and the body to bias the displacement member against movement from the first position to the second position. The signal generator produces produce one of a visually detectable signal, a tactile signal and an audible signal upon the gate being moved with the displacement member from a first position, distal to the reverse polarity dopant, to a second position to dispose the gate proximal to the reverse polarity dopant and intermediate the source metal electrode and the drain metal electrode. Such movement of the gate causes a change in conductivity within the circuit, i.e. between the drain metal electrode and the source metal electrode, because the conductivity of the circuit is controlled by an electric field which is generated by the voltage difference between the body and the gate on the displacement member wherein the gate being distal to the reverse polarity dopant on the body results in a very low conductivity within the circuit between the drain metal electrode and the source metal electrode and movement of the gate to a position that is proximal to the reverse polarity dopant and intermediate the source metal electrode and the drain metal electrode substantially increases the conductivity within the circuit between the drain metal electrode and the source metal electrode. The substantial increase in conductivity provides sufficient electrical current from the battery to the signal generator to produce the visually detectable signal, the tactile signal and/or the audible signal. Upon coagulation and contraction of the blood sample introduced into the cavity on the body, the displacement member may be moved to the second position and the gate is moved proximal to the reverse polarity dopant and intermediate the source metal electrode and the drain metal electrode to activate the signal generator.

Another embodiment of the apparatus of the present invention comprises an electrochemical switch. More specifically, the apparatus comprises a first portion of the indicator that includes a circuit having a signal generator, the circuit being coupled to a first chemical chamber on the body and to a second chemical chamber on the body that is aligned, but spaced apart from, the first chemical chamber. The apparatus further includes a volume of a first reactant chemical in the first chemical chamber and a volume of a second reactant chemical, electrochemically reactive with the first reactant chemical, in the second reactant chemical. The displacement member is movably disposed on the body intermediate the first chemical chamber and the second chemical chamber of the body to isolate the first reactant chemical from the second reactant chemical with the displacement member in the first position. A second portion of the indicator on the displacement member includes a porous membrane that is not aligned with the first chemical chamber or the second chemical chamber with the displacement member in the first position. Upon coagulation and contraction of the blood sample introduced into the cavity on the body, the displacement member may be moved to the second position and the porous membrane is thereby aligned with the first reactant chamber and the second reactant chamber. The first reactant chemical and the second reactant chemical are then placed in electrochemical engagement one with the other through the porous membrane of the displacement member, and such electrochemical engagement of the first reactant chemical and the second reactant chemical results in an electrochemical reaction between the first reactant chemical and the second reactant chemical and produces an electrical current in the circuit that activates the signal generator and produces a visually detectable signal, a tactile signal and/or an audibly detectable signal.

One embodiment of the apparatus of the present invention includes a deformable member that provides a visually detectable signal. More specifically, the apparatus includes a first portion of an indicator on the body having a deformable member and a second portion of the indicator on the displacement member that includes a traveling member. The traveling member moves from a first position relative to the deformable member on the body to a second position relative to the deformable member on the body as the displacement member moves from the first position relative to the body to a second position relative to the body. The deformable member is disposed on the body in the pathway of the traveling member as the displacement member moves from the first position to the second position on the body. Upon introduction of a blood sample into the cavity of the body and subsequent contraction of the blood sample due to coagulation, the displacement member may move from the first position to the second position and the traveling member will be moved to engage and deform the deformable member to provide a visually detectable signal.

It will be understood that in the various embodiments of the apparatus of the present invention, the introduction of the sample of blood into the cavity of the body, and the subsequent clotting of the sample of blood, results in a displacing force being imparted to the wetted member of the displacement member that forms at least a portion of the wall of the cavity. It will be understood by the various embodiments that an indicator of the apparatus of the present invention typically has a first portion on the body and a second portion on the displacement member. The force imparted to the wetted member of the displacement member as a result of the clotting blood sample displaces the displacement member from its first position towards a second position. The amount of work done on the displacement member by the clotting blood sample is a function of the force applied to the displacement member by the clotting blood sample and the distance over which the displacement member is moved by the force and against the retaining force of the spring element disposed intermediate the body of the apparatus and the displacement member of the apparatus. A sufficient displacing force applied to the displacement member over a sufficient distance, i.e. a sufficient amount of work imparted to the displacement member, displaces the displacement member to the second position relative to the body to thereby at least one of engage, align and/or deform the second portion of the indicator on the displacement member with the first portion of the indicator on the body to produce the signal indicating that the blood sample has at least the clotting capacity required to displace the displacement member against the retaining force applied by the spring element and from the first position to the second position. The signal indicates to the user that a known condition of the blood sample that is introduced into the cavity of the body. The lack of generation of the signal indicates to the user that the blood sample introduced into the cavity lacks the capacity to clot required for a blood sample to impart the force on the wetted member of the displacement member to displace the displacement member from the first position to the second position.

In one embodiment of the apparatus of the present invention, the spring constant of the spring element and the distance required to move the displacement member from the first position to the second position are together predetermined to result in the engagement or alignment of the second portion of the indicator with the first portion of the indicator to indicate one of a presence and an absence of a specific condition of the sample of blood introduced into the cavity of the body. This makes the indicator a discrete indicator, meaning that the blood sample that is introduced into the cavity of the apparatus either has a sufficient capacity to clot to overcome the retaining force applied to the displacement member by the spring element and to displace the displacement member the distance from the first position to the second position to activate the detectable signal, or it does not.

BRIEF DESCRIPTION OF THE DRAWINGS

FIG. 20 is a plan view of an embodiment of an apparatus of the present invention having an interruptible optical discrete indicator for alerting the user to a condition of a blood sample.

FIG. 21 is the plan view of the apparatus of FIG. 20 after the blood sample coagulates and contracts to form a coagulated blood sample and to thereby interrupt the optical pathway to alert the user to a condition of the blood sample.

FIGS. 1-23 illustrate some of the embodiments of an apparatus of the present invention, but should not be viewed as limiting of the scope of the invention, which is limited only by the claims appended hereto. It will be understood that the words "activate," when used in connection with a "signal," means to produce a user-observable indicator. Such an indicator may be positive, as when an electrically-powered light element is energized by current, when a segmented optical pathway is enabled by alignment of the segments to produce a pathway through which light may pass unobstructed, or when a detectable element is moved to within a proximity of a Hall effect sensor, but an indicator may also be negative, as when an electrically-powered light element is deenergized by interruption of a previously enabled current, when a previously aligned segment of a segmented optical pathway is misaligned, or when a detectable element is displaced out of proximity of a Hall effect sensor. It will be understood that an observable signal means that an event occurs that is observable to a user to indicate the condition of a blood sample.

DETAILED DESCRIPTION OF PREFERRED EMBODIMENTS

Figure 1:
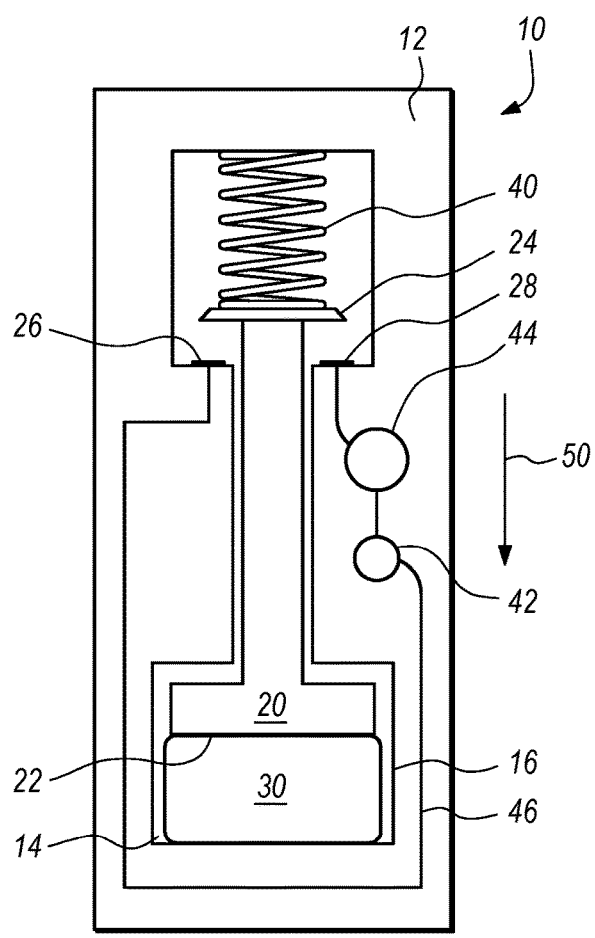
FIG. 1 is a plan view of an embodiment of an apparatus of the present invention having an electrical discrete indicator for alerting the user to a condition of a blood sample.
Figure 2:
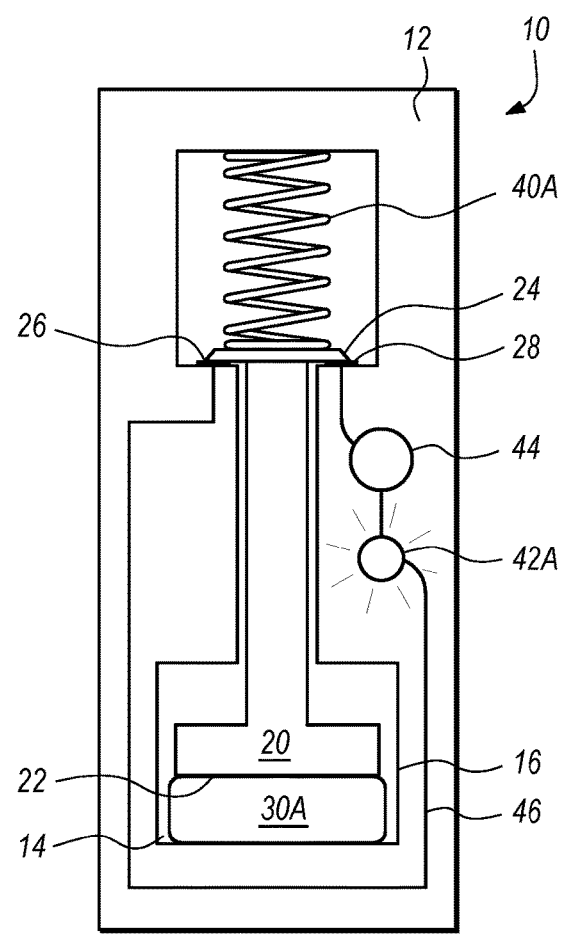
FIG. 2 is the plan view of the apparatus of FIG. 1 after the blood sample coagulates and contracts to form a coagulated blood sample and to thereby enable an electrical circuit to indicate to the user a condition of the blood sample.

FIG. 1 is a plan view of an embodiment of an apparatus 10 of the present invention having an electrical discrete indicator for alerting the user to a condition of a blood sample, the apparatus 10 having a body 12, a cavity 14 on the body 12 to receive a blood sample 30, a displacement member 20 movable on the body 12 between a first position, shown in FIG. 1, and a second position shown in FIG. 2. The displacement member 20 includes a wetted portion 22 forming a portion of a wall 16 that surrounds the cavity 14 and the blood sample 30 introduced therein. The apparatus 10 of FIG. 1 further includes a spring element 40 disposed intermediate the body 12 and the displacement member 20 to bias the displacement member 20 against movement from the first position to the second position. The apparatus 10 further includes an electrical power source 44 such as, for example, but not by way of limitation, a battery or a photovoltaic device, a signal generator 42 such as, for example, but not by way of limitation, a visually detectable signal generator, a tactile signal generator and an audible signal generator. A visually detectable signal generator is preferably a light emitting diode or a liquid crystal display, but may also include other types of light emitting devices such as an incandescent bulb, a fluorescent bulb. A tactile signal generator is preferably a vibrating device. An audible signal generator may be a piezo-ceramic transducer or an electro-magnetic type signal generator, and either of these audible signal generators will include a base material mounted within a sound chamber and a drive circuit which supplies an output that is applied to the base material causing deflections that produce acoustic waves. The apparatus 10 of FIG. 1 further includes an electrically conductive circuit 46 coupled to the electrical power source 44, the signal generator 42 and to a pair of electrical contacts 26 and 28, and a conductive and movable bridge member 24 coupled to the displacement member 20 and disposed proximal to the electrical contacts 26 and 28 with the displacement member 20 in the first position as shown in FIG. 1. It can be seen in FIG. 1 that the bridge member 24 is not engaged with the electrical contacts 26 and 28 and, as a result, the circuit 46 to which the electrical power source 44 and the signal generator 42 are coupled is open and the signal generator 42 is, therefore, not energized.

FIG. 2 is the plan view of the apparatus 10 of FIG. 1 after the blood sample 30 coagulates and contracts to form a coagulated blood sample 30A. The coagulated blood sample 30A contracts within the cavity 14 and it adheres to the wetted portion 22 of the displacement member 20 and moves the displacement member 20 towards the position of the displacement member 20 shown in FIG. 2 as the blood sample 30 contacts. If the blood sample 30 introduced into the cavity 14 of the apparatus 10 (see FIG. 1) has sufficient capacity for clotting, the displacement member 20 will be moved by an amount sufficient to engage the bridge member 24 with the electrical contacts 26 and 28 to complete and close the electrical circuit 46 and to thereby energize the signal generator 42A using electrical current provided by the electrical power source 44. Closure of the circuit 46 produces a signal that may be a visually detectable signal, a tactile signal or an audibly detectable signal to alert the user that the blood sample originally introduced into the cavity 14 as shown in FIG. 1 has a sufficient capacity to clot to displace the displacement member 20 to close the circuit 46. It will be understood by those skilled in the mechanical arts that the amount of work done by the clotting blood sample 30A on the displacement member 20 is a function of the spring constant of the spring element 40 shown in FIG. 1 (or of the spring element 40A shown in its deformed state in FIG. 2) and also of the distance of displacement of the displacement member 20 from its original or first position shown in FIG. 1 to the displaced or second position shown in FIG. 2. The spring constant of the spring element 30 or 30A and the displacement distance required to engage the bridge member 24 with the electrical contacts 26 and 28 can be together predetermined to produce the signal (i.e. to close the circuit 46) at a chosen capacity of the blood sample 30 to clot.

The apparatus 10 illustrated in FIGS. 1 and 2 includes an electrical indicator having a first portion (the electrical contacts 26 and 28, the circuit 46, the electrical power source 44 and the signal generator 42) on the body 12 and a second portion (the bridge member 24) on the displacement member 20 with the second portion (bridge member 24) disengaged from the first portion (the electrical contacts 26 and 28, the circuit 46, the electrical power source 44 and the signal generator 42), leaving the signal generator 42 unenergized. The force applied to the wetted portion 22 of the displacement member 20 by the adherence of the contracting and coagulating blood sample 30A moves the displacement member 20 from the first position (shown in FIG. 1) to the second position (shown in FIG. 2) and the threshold amount of work done on the displacement member 20 to produce the displacement from the first position to the second position and to overcome the retaining force of the spring element 40 provides clinicians with a clear and discrete indication that the blood sample has a predetermined amount of capacity to clot. The specific nature of the discrete indicator of the apparatus that alerts the user upon confirmation of a predetermined condition of the blood sample introduced therein may vary without departure from the mode of operation of the apparatus, as will be illustrated below in connection with other embodiments of the apparatus.

Figure 3:
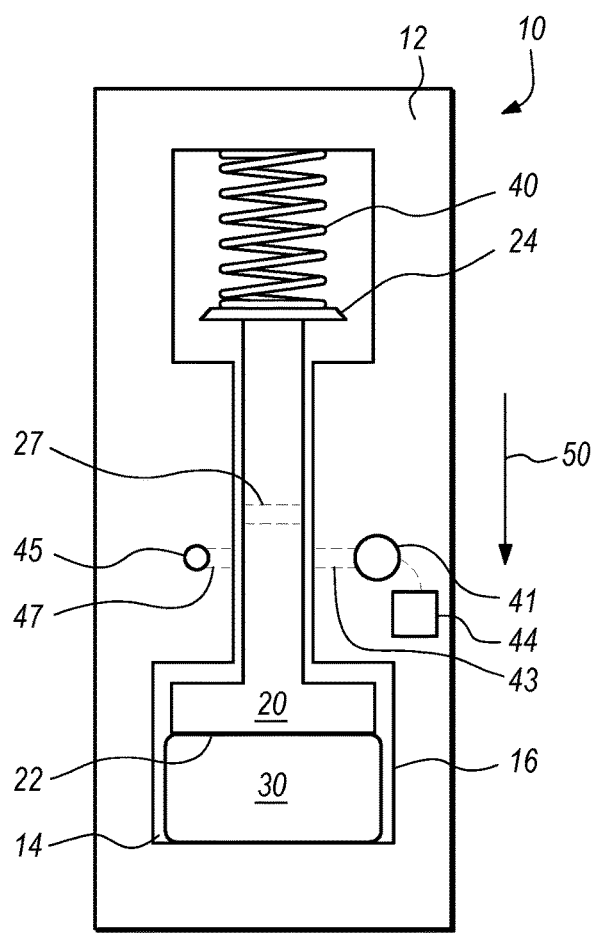
FIG. 3 is a plan view of an embodiment of an apparatus of the present invention having an optical discrete indicator for alerting the user to a condition of a blood sample.
Figure 4:
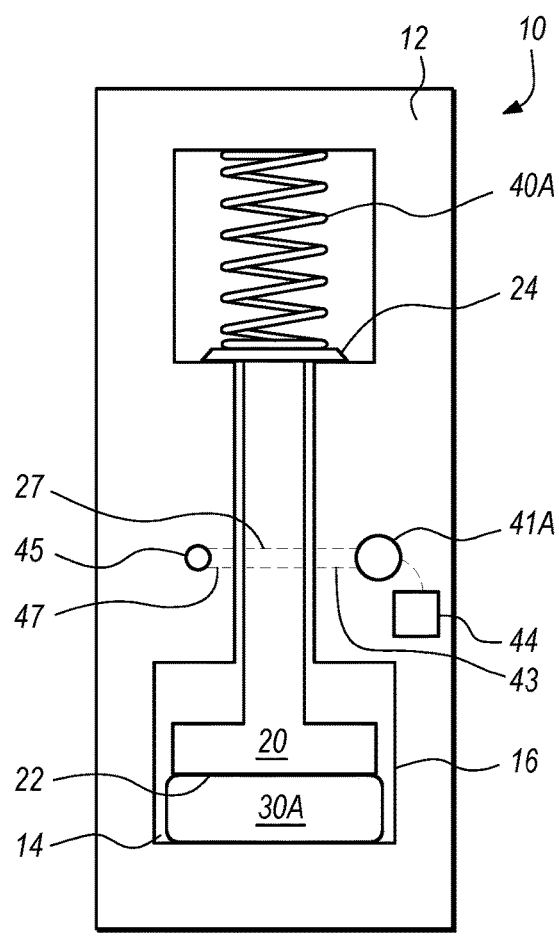
FIG. 4 is the plan view of the apparatus of FIG. 3 after the blood sample coagulates and contracts to form a coagulated blood sample and to thereby enable an optical pathway to transmit light to indicate to the user a condition of the blood sample.

FIG. 3 is a plan view of an embodiment of an apparatus 10 of the present invention having an optical discrete indicator for alerting the user to a condition of a blood sample, the embodiment of the apparatus 10 having, like that of FIGS. 1 and 2, a body 12, a cavity 14 on the body 12 to receive a blood sample 30, a displacement member 20 movable on the body 12 between a first position, shown in FIG. 3, and a second position shown in FIG. 4. The displacement member 20 includes a wetted portion 22 forming a portion of a wall 16 that surrounds the cavity 14 and the blood sample 30 introduced therein. The apparatus 10 of FIG. 2 includes spring element 40 disposed intermediate the body 12 and the displacement member 20 to bias the displacement member 20 against movement from the first position to the second position. The apparatus 10 further includes a light source 41 such as, for example, but not by way of limitation, an ambient light entry port or an energizable light source such as an LED (light emitting diode) powered by a battery or a photovoltaic device 44 (as previously discussed above in relation to FIGS. 1 and 2). An ambient light entry port light source 41 includes a highly reflective interior open to a first light pathway segment 43 in the body 12 of the apparatus 10. The first light pathway segment 43 is aligned with, but separated from, a second light pathway segment 47 in the body 12 of the apparatus 10. The second light pathway segment 47 is open to a visually detectable signal generator 45 that is illuminated when light enters the second light pathway segment 47. The first light pathway segment 43 is isolated from the second light pathway segment 47 by the displacement member 20 when the displacement member 20 is in the first position illustrated in FIG. 3, and no light from the light source 41 will illuminate the signal generator 45. The displacement member 20 includes a movable light pathway segment 27 that is misaligned with the first light pathway segment 43 and the second light pathway segment 47 when the displacement member 20 is in the first position as illustrated in FIG. 3. A blood sample is introduced into the cavity 14 in the body 12 of the apparatus 10 for testing.

FIG. 4 is the plan view of the apparatus 10 of FIG. 3 after the blood sample 30 coagulates and contracts to form a coagulated blood sample 30A. The coagulated and clotted blood sample 30A adheres to the wetted portion 22 of the displacement member 20 as it contracts, and a displacing force imparted to the displacement member 20 by the coagulating blood sample 30A moves the displacement member 20 to align the movable light pathway segment 27 on the displacement member 20 with the first light pathway segment 43 and the second light pathway segment 47 on the body 12. This alignment allows light emitted by the light source 41 (either an ambient light entry port or an energizable light source) into the first light pathway segment 43 to pass through the aligned movable light pathway segment 27 and the aligned second light pathway segment 47 to illuminate the signal generator 45.

It will be understood that one or more of the first light pathway segment 43, the movable light pathway segment 27 and the second light pathway segment 47 may, in some embodiments, contain optical transmission medium such as, for example, glass or optical fiber(s) to transmit light from the light source 41 to the signal generator 45. Alternately, or in addition, the walls of one or more of the first light pathway segment 43, the movable light pathway segment 27 and the second light pathway segment 47 may be highly reflective to deter loss of light by absorption, thus enhancing the extent to which light from the light source 41 is delivered to illuminate the signal generator 45.

Figure 5:
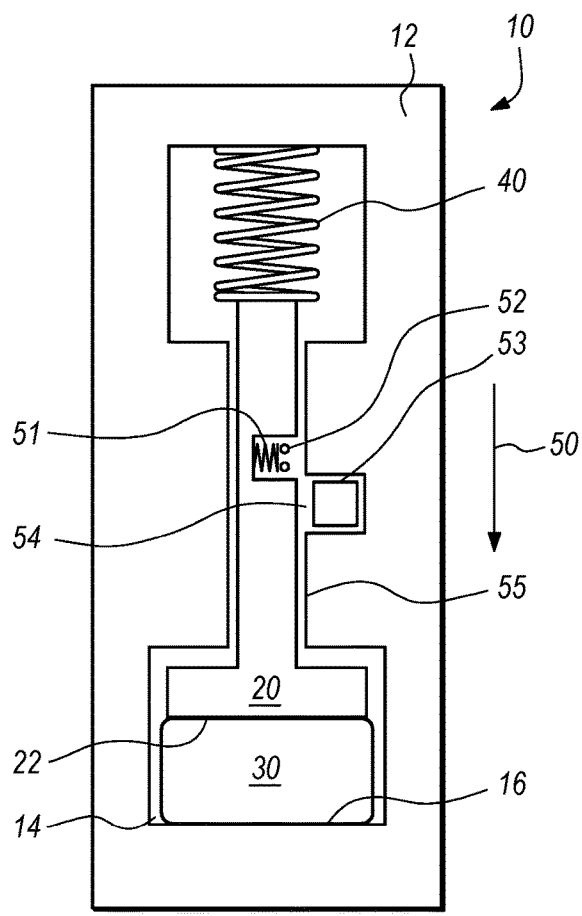
FIG. 5 is a plan view of an embodiment of an apparatus of the present invention having a discrete indicator having a mechanical switch for alerting the user to a condition of a blood sample.
Figure 6:
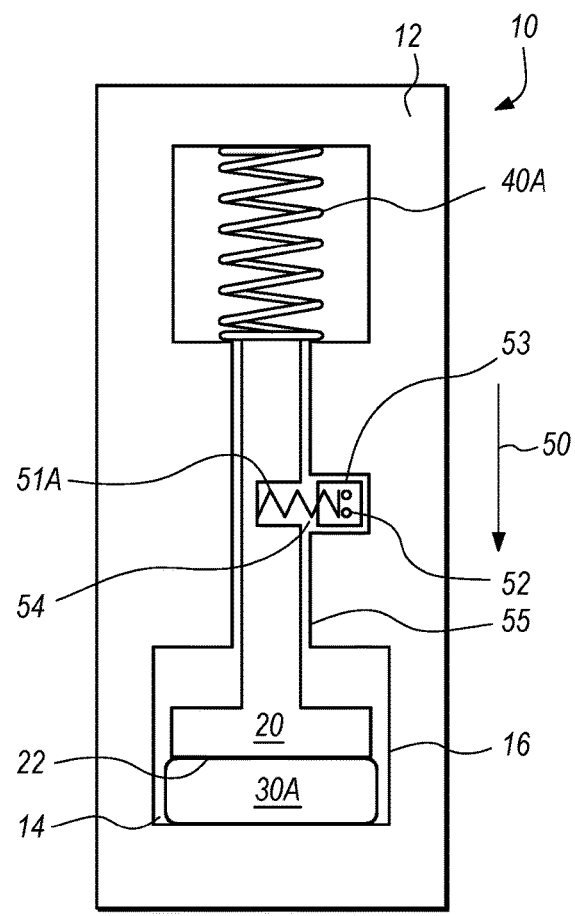
FIG. 6 is the plan view of the apparatus of FIG. 5 after the blood sample coagulates and contracts to form a coagulated blood sample to thereby enable activation of the mechanical switch to indicate to the user a condition of the blood sample.

FIG. 5 is a plan view of an embodiment of an apparatus 10 of the present invention having a discrete indicator having a mechanical switch for alerting the user to a condition of a blood sample, the embodiment of the apparatus 10 having a body 12 with a cavity 14 in the body 12 to receive a blood sample 30, a displacement member 20 movable relative to the body 12 from a first position illustrated in FIG. 5 to a second position illustrated in FIG. 6. The displacement member 20 of the apparatus 10 includes a wetted portion 22 that forms a portion of a wall 16 that surrounds the cavity 14 and the blood sample 30 introduced therein. The apparatus 10 of FIG. 5 includes spring element 40 disposed intermediate the body 12 and the displacement member 20 to bias the displacement member 20 against movement from the first position to the second position. The apparatus 10 further includes a position indicator 52 received on the displacement member 20 and a deformed switch spring element 51 disposed intermediate the switch spring element 51 and the displacement member 20 to bias the position indicator 52 towards a stop 55 on the body 12. The apparatus 10 of FIG. 5 further includes a recess 54 and a transparent window 53 through which the empty recess 54 is visible. The position indicator 52 is not aligned with the recess 54 with the displacement member 20 in the first position relative to the body 12.

FIG. 6 is the plan view of the apparatus 10 of FIG. 5 after the blood sample 30 coagulates and contracts to form a coagulated blood sample 30A, thereby moving the displacement member 20 in the direction of arrow 50 to align the position indicator 52 with the recess 54. The coagulated and clotted blood sample 30A adheres to the wetted portion 22 of the displacement member 20 as it contracts, and a displacing force imparted to the displacement member 20 by the coagulating blood sample 30A moves the displacement member 20 to align the spring-biased position indicator 52 on the displacement member 20 with the recess 54 on the body 12. This alignment allows the switch spring element 51A to expand from its deformed mode shown in FIG. 5 and to displace the position indicator 52 into the aligned recess 54. The position indicator 52 is visible to the user of the apparatus 10 through the transparent window 53.

Figure 7:
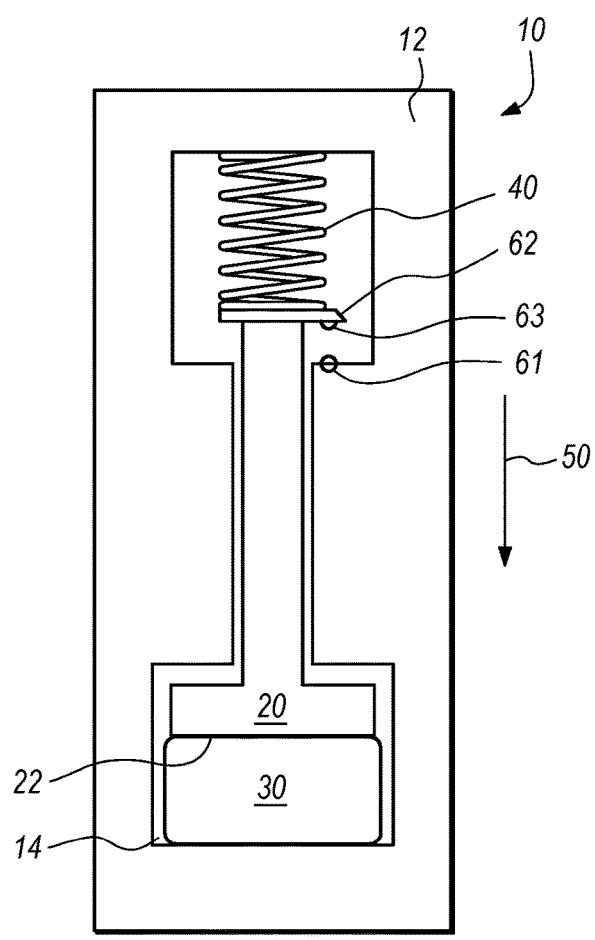
FIG. 7 is a plan view of an embodiment of an apparatus of the present invention having a discrete indicator having a chemical switch for alerting the user to a condition of a blood sample.
Figure 8:
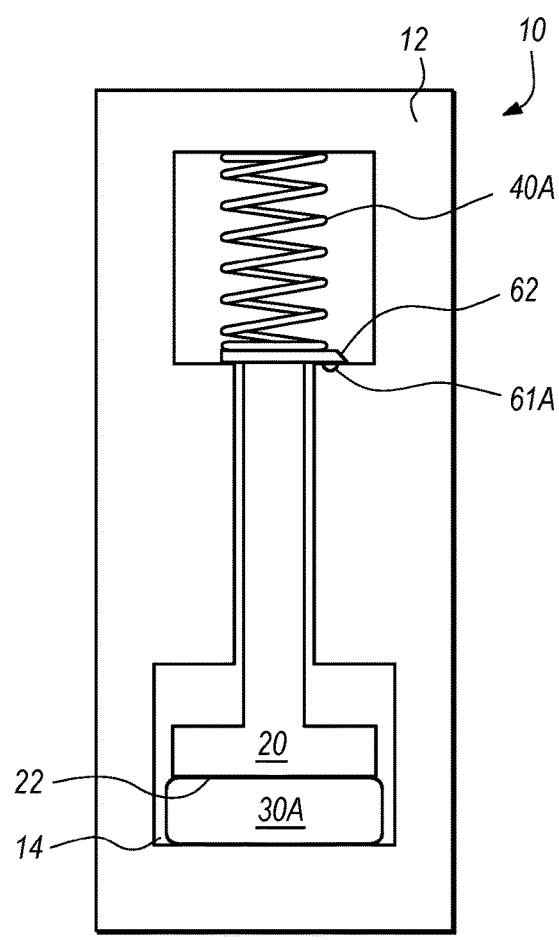
FIG. 8 is the plan view of the apparatus of FIG. 7 after the blood sample coagulates and contracts to form a coagulated blood sample to engage a first reactant with a second reactant to produce a chemical reaction to indicate to the user a condition of the blood sample.

FIG. 7 is a plan view of an embodiment of an apparatus 10 of the present invention having a discrete indicator having a chemical switch for alerting the user to a condition of a blood sample, the embodiment of the apparatus 10 having a body 12 with a cavity 14 in the body 12 to receive a blood sample 30, a displacement member 20 movable relative to the body 12 from a first position illustrated in FIG. 7 to a second position illustrated in FIG. 8. The displacement member 20 of the apparatus 10 includes a wetted portion 22 that forms a portion of a wall 16 that surrounds the cavity 14 and the blood sample 30 introduced therein. The apparatus 10 of FIG. 7 includes spring element 40 disposed intermediate the body 12 and the displacement member 20 to bias the displacement member 20 against movement from the first position to the second position. The apparatus 10 further includes a first chemical agent 61 disposed on the body 12 spaced apart from a second chemical agent 63 that is disposed on and moves with a thermochromic member 62 coupled to the displacement member 20. Contraction of the blood sample 30 upon coagulation causes the displacement member 20 to move downwardly in the direction of arrow 50 and, if the distance over which the displacement member 20 moves is sufficient, engages the first chemical agent 61 with the second chemical agent 63 to produce an exothermic reaction that raises the temperature of the thermochromic material 62 and causes it to change color. The change in color of the thermochromic material 62 alerts the user. One of the first chemical agent 61 and the second chemical agent 63 may include a gel that readily favorably flattens or disperses upon engagement with the other of the first chemical agent 61 and the second chemical agent 63 to favorably increase the surface area over which the exothermic reaction occurs. The thermochromic material 62 may, in one embodiment, be a thermochromic paint or coating applied to a portion of the displacement member 20 to provide a visually detectable signal.

FIG. 8 is the plan view of FIG. 7 after the blood sample 30 coagulates and contracts to form a coagulated blood sample 30A, thereby moving the displacement member 20 in the direction of arrow 50 to engage the first chemical agent 61 with the second chemical agent 63 see FIG. 7) to produce chemical reactants 61A. The heat produced as a result of the exothermic reaction of the first chemical agent 61 and the second chemical agent 63 raises the temperature of the thermochromic material 62 and causes at least a portion 62A of the thermochromic member 62 to change in color, thereby alerting the user to a condition of the blood sample 30A. Optionally, in embodiments of the present invention in which the first chemical agent 61 and the second chemical agent 63 react to produce a chemiluminescent reaction, the thermochromic member 62 would represent a carrier of the second chemical agent 63 and the portion 62A of the carrier 62 would represent light produced by the reaction.

Figure 9:
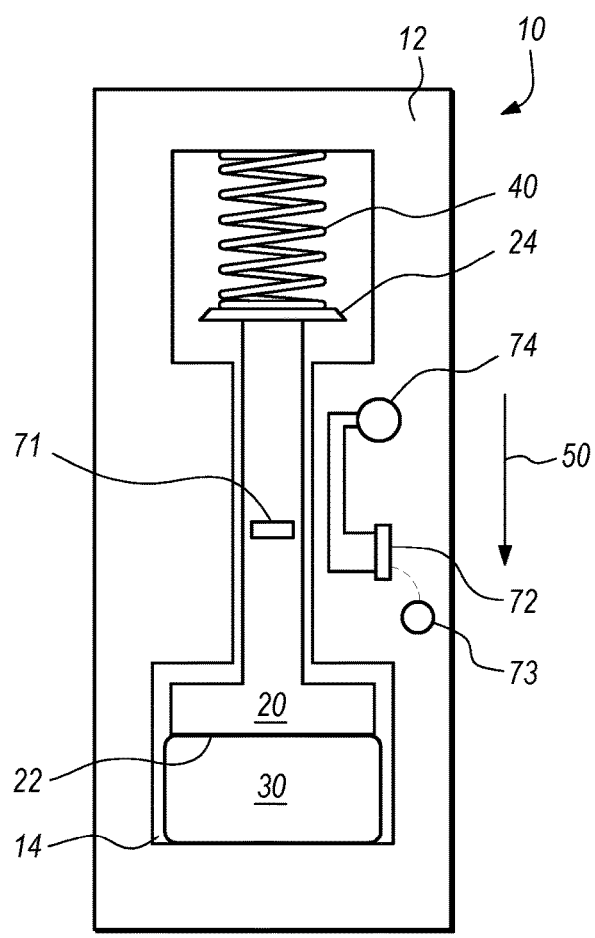
FIG. 9 is a plan view of an embodiment of an apparatus of the present invention having a discrete indicator having a Hall effect sensor as a switch for alerting the user to a condition of a blood sample.
Figure 10:
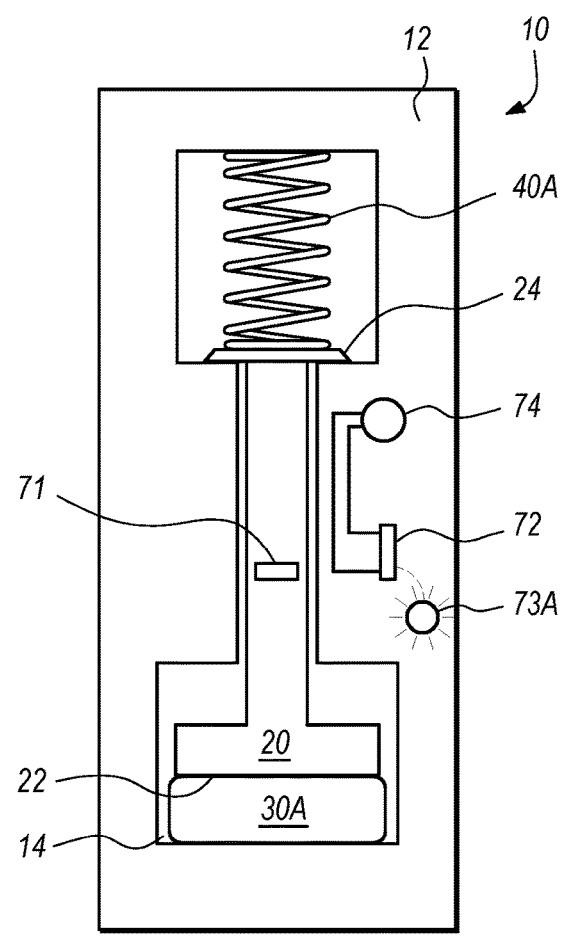
FIG. 10 is the plan view of the apparatus of FIG. 9 after the blood sample coagulates and contracts to form a coagulated blood sample to displace a detectable sensor into proximity and to enable a circuit to indicate to the user a condition of the blood sample.

FIG. 9 is a plan view of an embodiment of the present invention having a discrete indicator having a Hall effect sensor as a switch for alerting the user to a condition of a blood sample, the embodiment of the apparatus 10 having a body 12 with a cavity 14 in the body 12 to receive a blood sample 30, a displacement member 20 movable relative to the body 12 from a first position illustrated in FIG. 9 to a second position illustrated in FIG. 10. The displacement member 20 of the apparatus 10 includes a wetted portion 22 that forms a portion of a wall 16 that surrounds the cavity 14 and the blood sample 30 introduced therein. The apparatus 10 of FIG. 9 includes spring element 40 disposed intermediate the body 12 and the displacement member 20 to bias the displacement member 20 against movement from the first position to the second position. The apparatus 10 further includes a position sensor 72 disposed on the body 12 spaced apart from a magnet 71 that is disposed on and moves with the displacement member 20. Contraction of the blood sample 30 upon coagulation causes the displacement member 20 to move downwardly in the direction of arrow 50 and, if the distance over which the displacement member 20 moves is sufficient, positions the magnet 71 proximal to the position sensor 72 to produce one of a visually detectable signal, a tactile signal and an audible signal. In the embodiment of the apparatus 10 of FIG. 9, the position sensor 72 may, for example, comprise a thin strip of metal that has a current applied along it by the battery 74. The distribution of electrons in the position sensor 72 is generally uniform with the magnet 71 distal to the position sensor 72 as illustrated in FIG. 9.

FIG. 10 is the plan view of FIG. 9 after the blood sample 30 coagulates and contracts to form a coagulated blood sample 30A, thereby moving the displacement member 20 in the direction of arrow 50 to position the magnet 71 on the displacement member 20 proximal to the position sensor 72. The magnetic field produced by the magnet 71 deflects electrons within the position indicator (metal strip) towards one edge of the metal strip, thereby producing a voltage gradient across the short-side of the strip (perpendicular to the feed current) that can be detected using the voltage gradient indicator 73 to produce a visually detectable signal.

Hall effect sensors detect static (non-changing) magnetic fields. However, in another embodiment of the apparatus 10 may include an induction sensor in place of the Hall effect sensor. FIGS. 9 and 10 can also illustrated an embodiment of the apparatus 10 having an induction sensor. The position sensor 72 will comprise a coil of wire and reference numeral 74 will represent a voltage meter or other voltage indicator. A changing magnetic field caused by movement of the displacement member 20 and the magnet 71 thereon being proximal to the position sensor 72 (coil of wire) results in a current being induced in the coils of the position sensor 72, thereby producing a voltage at its output that can be detected using a voltage indicator.

Figure 11:
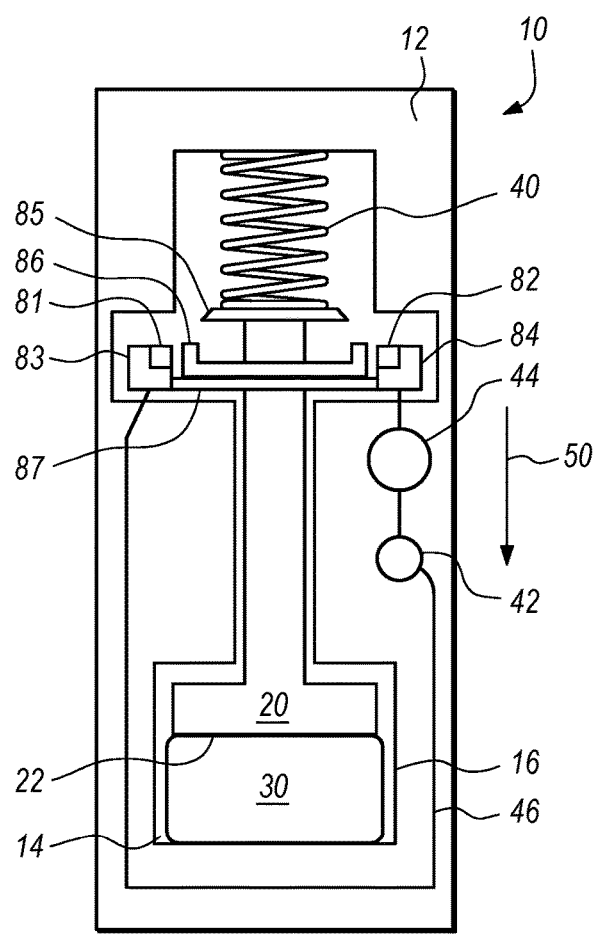
FIG. 11 is a plan view of an embodiment of an apparatus of the present invention having a discrete indicator having a field effect transistor (FET) as a switch for alerting the user to a condition of a blood sample.
Figure 12:
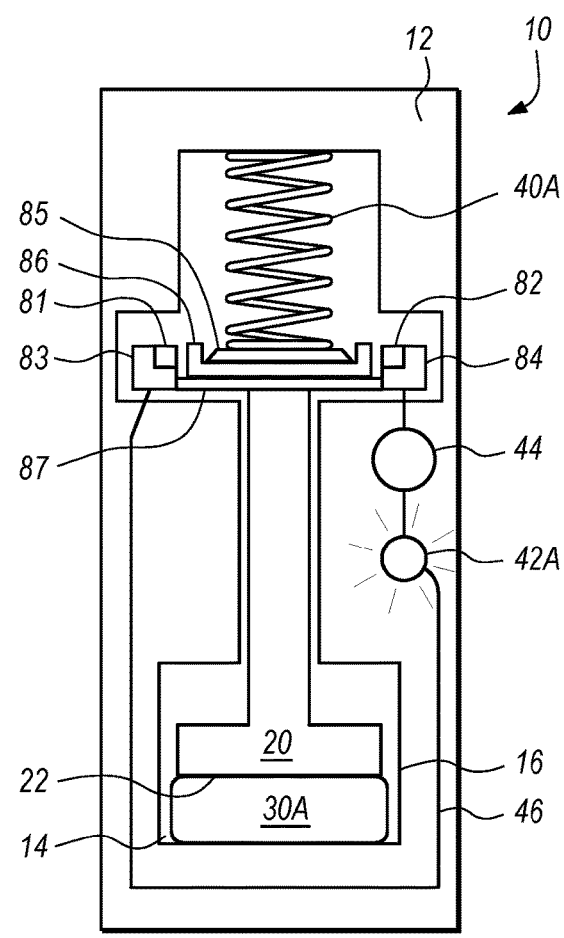
FIG. 12 is the plan view of the apparatus of FIG. 11 after the blood sample coagulates and contracts to form a coagulated blood sample to enable the FET to alert the user to a condition of the blood sample.

FIG. 11 is a plan view of an embodiment of the present invention having a discrete indicator having a field effect transistor (FET) as a switch for alerting the user to a condition of a blood sample, the embodiment of the apparatus 10 having a body 12 with a cavity 14 in the body 12 to receive a blood sample 30, a displacement member 20 movable relative to the body 12 from a first position illustrated in FIG. 11 to a second position illustrated in FIG. 12. The displacement member 20 of the apparatus 10 includes a wetted portion 22 that forms a portion of a wall 16 that surrounds the cavity 14 and the blood sample 30 introduced therein. The apparatus 10 of FIG. 11 includes spring element 40 disposed intermediate the body 12 and the displacement member 20 to bias the displacement member 20 against movement from the first position to the second position.

The apparatus 10 further includes a gate 85 on the displacement member 20 of the apparatus 10. The apparatus 10 further includes a source dopant 83 and a drain dopant 84, a reverse polarity dopant 87 disposed intermediate the source dopant 83 and the drain dopant 84, an oxide/dielectric 85 disposed intermediate the source dopant 83 and the drain dopant 84 and proximal to the reverse polarity dopant 87, a source metal electrode 81 adjacent the source dopant 83, a drain metal electrode 82 adjacent to the drain dopant 84, a circuit 46 coupled to a battery 44 and a signal generator 42, all disposed on the body 12 of the apparatus 10. The conductivity between the drain metal electrode 82 and the source metal electrode 81 is controlled by an electric field which is generated by the voltage difference between the body 12 and the gate 85 on the displacement member 20. The position of the gate 85 on the displacement member 20 relative to the body 12 illustrated in FIG. 11 results in a very low conductivity between the drain metal electrode 82 and the source metal electrode 81. Contraction of the blood sample 30 upon coagulation causes the displacement member 20 to move downwardly in the direction of arrow 50 and, if the distance over which the displacement member 20 moves is sufficient, positions the gate 85 proximal to the reverse polarity dopant 87 and intermediate the source metal electrode 81 and the drain metal electrode 82 as illustrated in FIG. 12.

FIG. 12 is the plan view of FIG. 11 after the displacement member 20 is moved by contraction of the coagulating blood sample 30A to position the gate 85 proximal to the reverse polarity dopant 87 and intermediate the source metal electrode 81 and the drain metal electrode 82. The positioning of the gate 85 as illustrated in FIG. 12 results in a dramatic increase in conductivity between the source metal electrode 81 and the drain metal electrode 82 that allows a sufficient amount of current to flow within the circuit 46 to produce one of a visually detectable signal, a tactile signal and an audible signal at the signal generator 42.

Figure 13:
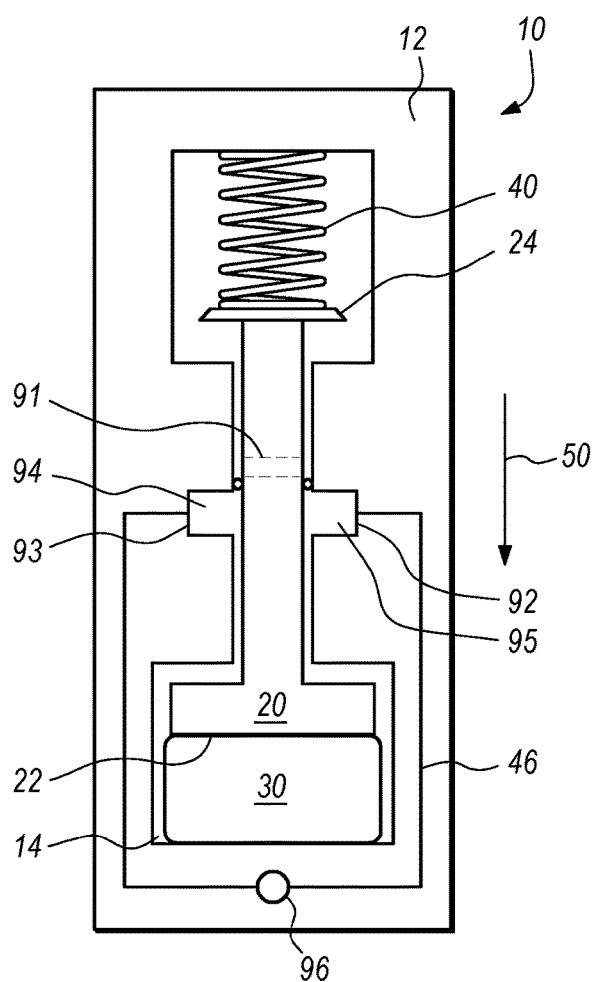
FIG. 13 is a plan view of an embodiment of an apparatus of the present invention having a discrete indicator with an electrochemical switch for alerting the user to a condition of a blood sample.
Figure 14:
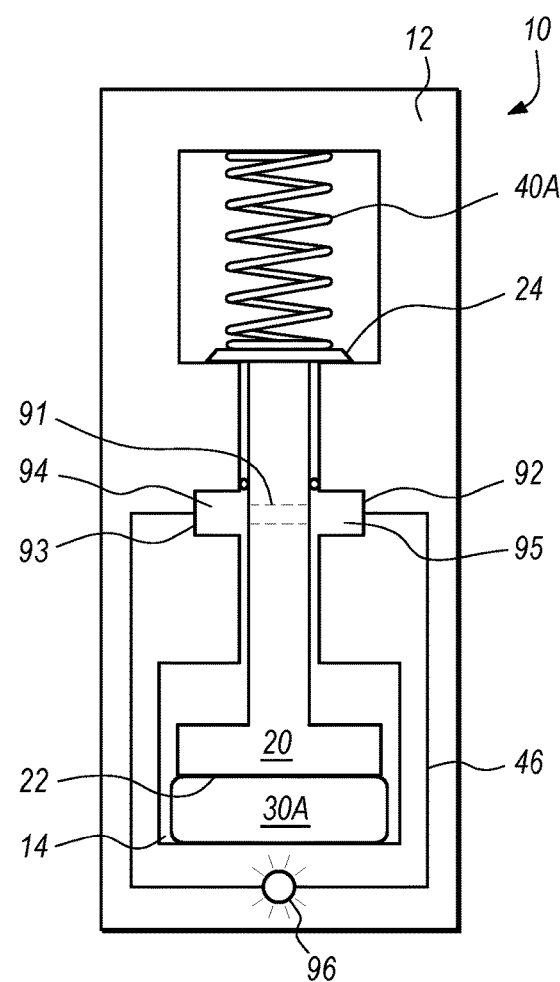
FIG. 14 is the plan view of the apparatus of FIG. 13 after the blood sample coagulates and contracts to form a coagulated blood sample to dispose a first reactant into chemical engagement with a second reactant to produce an electrochemical reaction to alert the user to a condition of the blood sample.

FIG. 13 is a plan view of an embodiment of the present invention having a discrete indicator with an electrochemical switch for alerting the user to a condition of a blood sample, the embodiment of the apparatus 10 having a body 12 with a cavity 14 in the body 12 to receive a blood sample 30, a displacement member 20 movable relative to the body 12 from a first position illustrated in FIG. 13 to a second position illustrated in FIG. 14. The displacement member 20 of the apparatus 10 includes a wetted portion 22 that forms a portion of a wall 16 that surrounds the cavity 14 and the blood sample 30 introduced therein. The apparatus 10 of FIG. 13 includes spring element 40 disposed intermediate the body 12 and the displacement member 20 to bias the displacement member 20 against movement from the first position to the second position. The apparatus 10 includes a first chemical chamber 92 and a second chemical chamber 93 in the body 12 of the apparatus 10. The first chemical chamber 92 is aligned with the second chemical chamber 93, and the first chemical chamber 92 is isolated from the second chemical chamber 93 by the displacement member 20 therebetween. The apparatus 10 further includes a porous membrane 91 in the displacement member 20 of the apparatus 10 that is not aligned with the first chemical chamber 92 and the second chemical chamber 93 with the displacement member 20 in the first position illustrated in FIG. 13. A first reactant chemical 95 is disposed in the first chemical chamber 92 in an electrolyte solution and a second reactant chemical 94 is disposed in the second chemical chamber 93 in an electrolyte solution. The first reactant chemical 95 is electrochemically reactive with the second chemical chamber 94. The apparatus 10 further includes a circuit 46 coupled to a signal generator 96 and also to each of the first chemical chamber 92 and the second chemical chamber 93.

FIG. 14 is the plan view of FIG. 13 after the displacement member 20 is moved by contraction of the coagulating blood sample 30A to position the porous membrane 91 intermediate the first chemical chamber 92 and the second chemical chamber 93 to place the first reactant chemical 95 into electrochemical engagement with the second reactant chemical 94. It will be understood that the migration of anions or cations across the porous membrane 91 will result in a current in the circuit 46 that will activate the signal generator 96 to produce one of a visually detectable signal, a tactile signal and an audible signal at the signal generator 42. The porous membrane 91 may, in one embodiment, be a selectively permeable membrane. The chemical reaction that occurs is a spontaneous redox reaction in which one of the first reactant chemical 95 and the second reactant chemical 94 is reduced and the other of the first reactant chemical 95 and the second reactant chemical 94 is oxidized, thus the term "redox." The current is the flow of electrons in the circuit is produced because the redox reaction requires that electrons leave one of the first chemical chamber 92 and the second chemical chamber 93 and move to the other of the first chemical chamber 92 and the second chemical chamber 93. The flow of electrons through the circuit 46 energizes the signal generator 96 which may be one or more of a visually detectable signal, a tactile signal and an audibly detectable signal.

Figure 15:
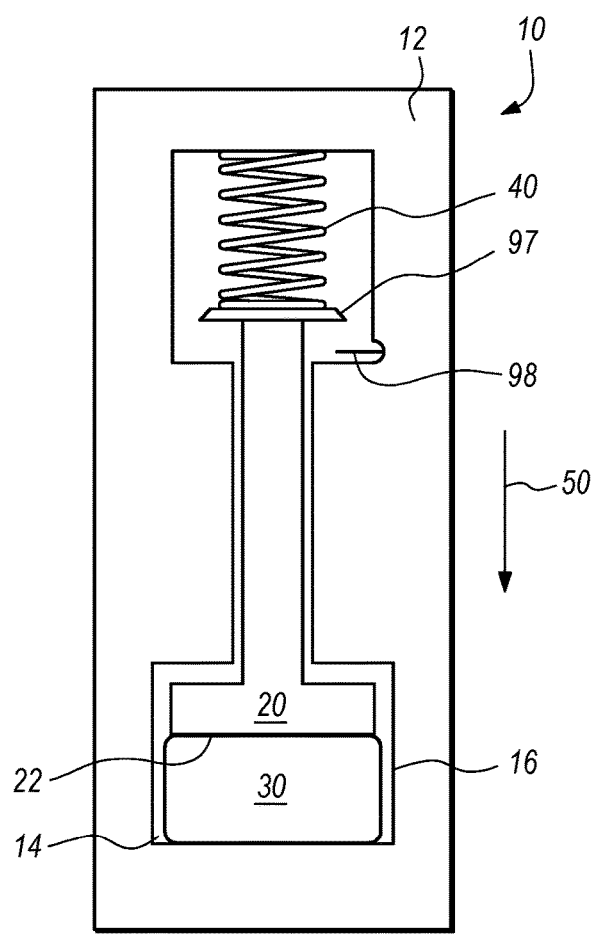
FIG. 15 is a plan view of an embodiment of an apparatus of the present invention having a discrete indicator with mechanically deformable member for alerting the user to a condition of a blood sample.
Figure 16:
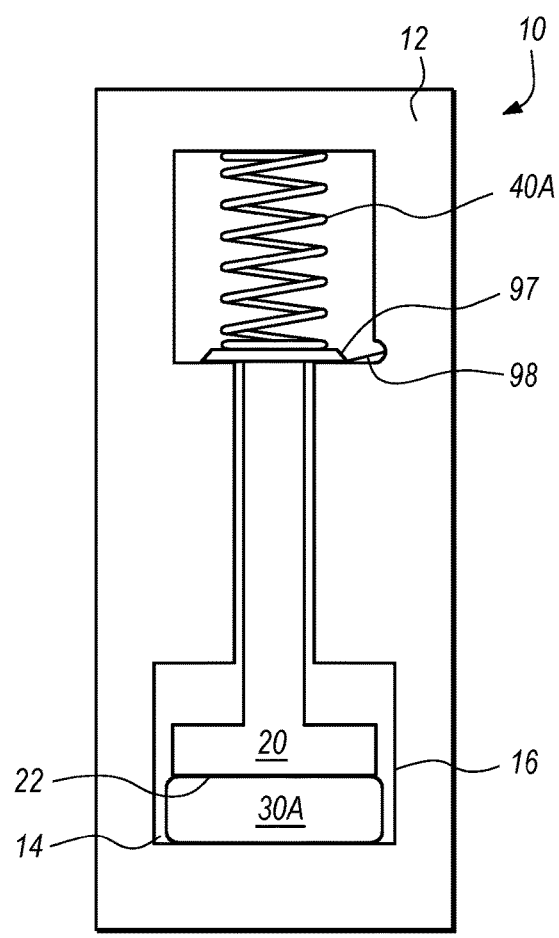
FIG. 16 is the plan view of the apparatus of FIG. 15 after the blood sample coagulates and contracts to form a coagulated blood sample to deform the mechanically deformable member to alert the user to a condition of the blood sample.

FIG. 15 is a plan view of an embodiment of the present invention having a discrete indicator with deformable member for alerting the user to a condition of a blood sample, the embodiment of the apparatus 10 having a body 12 with a cavity 14 in the body 12 to receive a blood sample 30, a displacement member 20 movable relative to the body 12 from a first position illustrated in FIG. 13 to a second position illustrated in FIG. 16. The displacement member 20 of the apparatus 10 includes a wetted portion 22 that forms a portion of a wall 16 that surrounds the cavity 14 and the blood sample 30 introduced therein. The apparatus 10 of FIG. 13 includes spring element 40 disposed intermediate the body 12 and the displacement member 20 to bias the displacement member 20 against movement from the first position to the second position. The apparatus 10 includes a traveling member 97 that moves with the displacement member 20 and a deformable barrier 98 on the body 12 and in the path of the traveling member 97 as the displacement member 20 is moved in the direction of arrow 50.

FIG. 16 is the plan view of FIG. 15 after the displacement member 20 is moved by contraction of the coagulating blood sample 30A to engage and deform the deformable barrier 98 upon being displaced to the second position illustrated in FIG. 16.

Although specific embodiments of the invention have been described herein in some detail, this has been done solely for the purposes of explaining the various aspects of the invention, and is not intended to limit the scope of the present invention, which is limited only by the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

Figure 17:
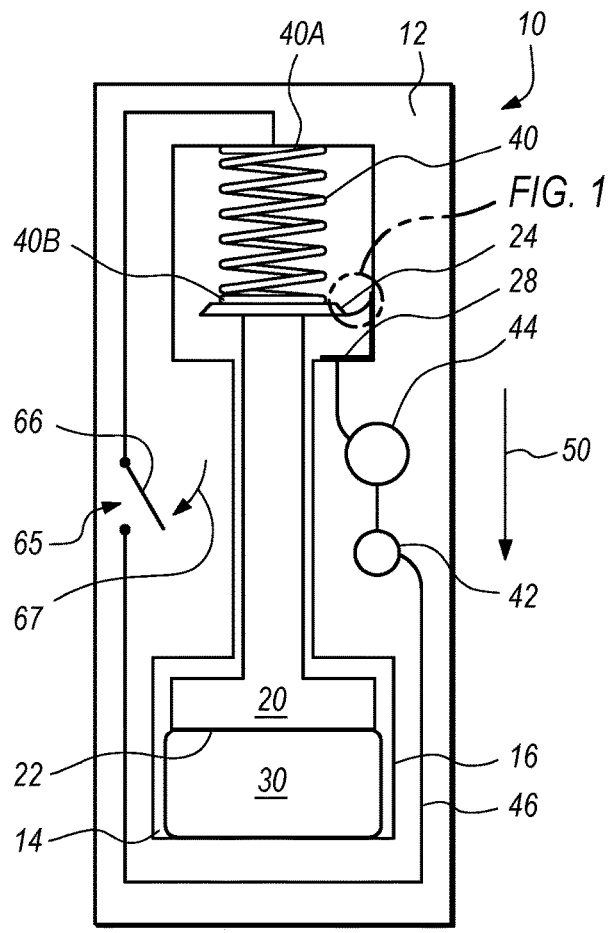
FIG. 17 is the plan view of an embodiment of an apparatus of the present invention having an interruptible electrical discrete indicator for alerting the user to a condition of a blood sample.
Figure 18:
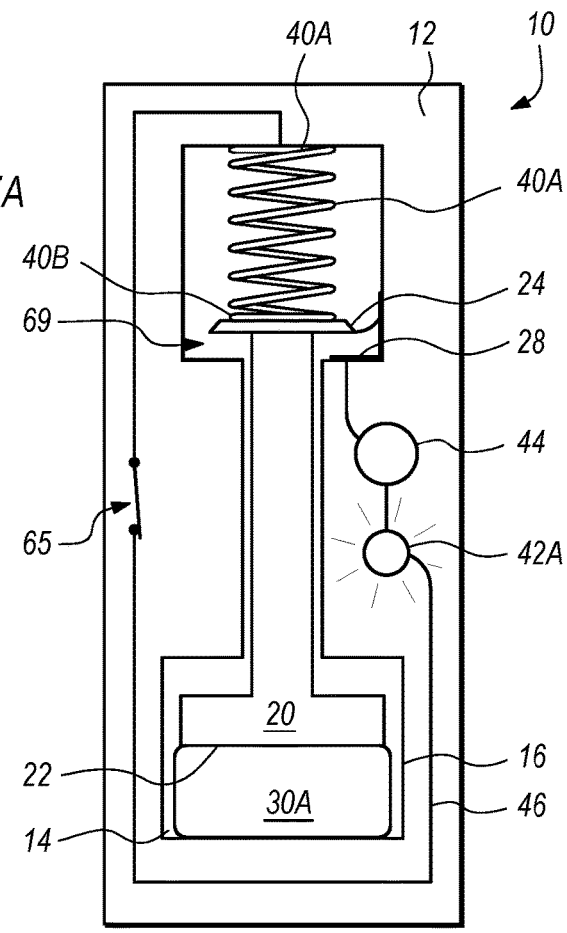
FIG. 18 is the plan view of the apparatus of FIG. 17 after the blood sample coagulates and partially contracts to form a partially coagulated blood sample, the contraction being sufficient to deform, but not sufficient to rupture, a spring element.
Figure 19:
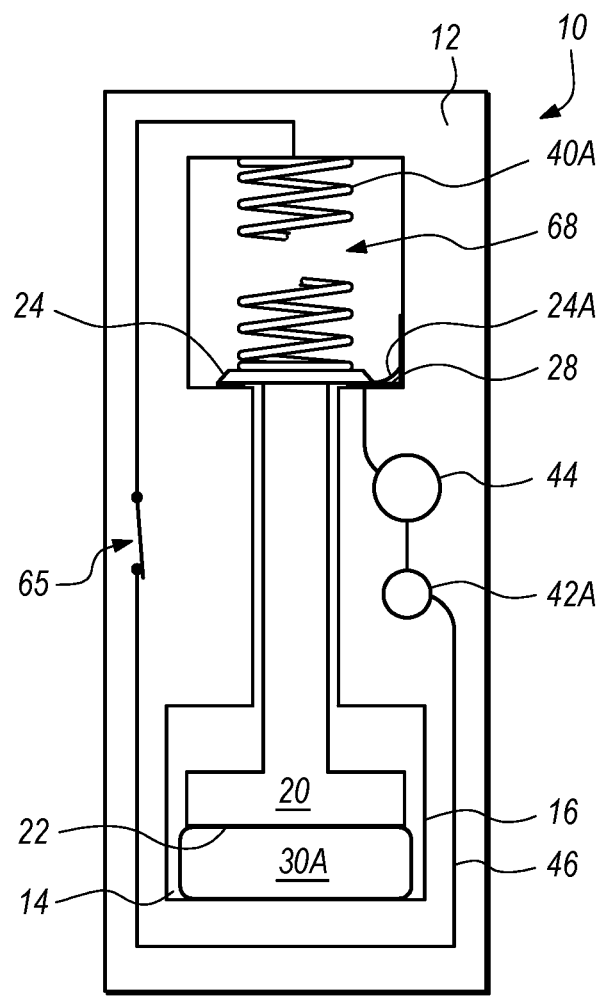
FIG. 19 is the plan view of the apparatus of FIGS. 17 and 18 after the blood sample coagulates and contracts to form a coagulated blood sample, the contraction being sufficient to rupture a spring element and to thereby interrupt a conductive circuit to thereby indicate to the user to a condition of the blood sample.

FIG. 17 is a plan view of an embodiment of an apparatus 10 of the present invention having an electrical discrete indicator for alerting the user to a condition of a blood sample, the apparatus 10 having a body 12, a cavity 14 on the body 12 to receive a blood sample 30, a displacement member 20 movable on the body 12 movable from a first position, shown in FIG. 17, and a second position shown in FIG. 18, and further movable from the second position, shown in FIG. 18 and a third position shown in FIG. 19. The apparatus 10 of FIG. 17 further includes a frangible and conductive spring element 40 disposed intermediate the body 12 and the displacement member 20 to bias the displacement member 20 against movement from the first position towards the second and third positions shown in FIGS. 18 and 19, respectively. The apparatus 10 of FIG. 17 further includes an electrical power source 44 such as, for example, but not by way of limitation, a battery or a photovoltaic device, a signal generator 42 such as, for example, but not by way of limitation, a visually detectable signal generator, a tactile signal generator and an audible signal generator of the types described above in connection with FIGS. 1 and 2. The apparatus 10 of FIG. 17 further includes an electrically conductive circuit 46 coupled to the electrical power source 44, the signal generator 42, to the proximal end 40A of the frangible and conductive spring element 40, and to an electrical contact 28 having a flexible and conductive filament 24A (see FIG. 17A) extending therefrom. The conductive filament 24A is flexible and compliant, and is adapted to slidably engage the "L"-shaped stationary electrical contact 28 on the body 12 as the displacement member 20 moves from the position shown in FIG. 17 through the position shown in FIG. 18 to the position shown in FIG. 19. The conductive filament 24A, the "L"-shaped stationary electrical contact 28, the spring element 40, the power source 44 and the signal generator 42 are all coupled within the electrical circuit 46 as shown in FIG. 17.

The embodiment of the apparatus 10 of the present invention shown in FIGS. 17-19 further includes a switch 65 movable from an open position indicated by the line 66 and in the direction of arrow 67 to a closed position.

Figure 17A:
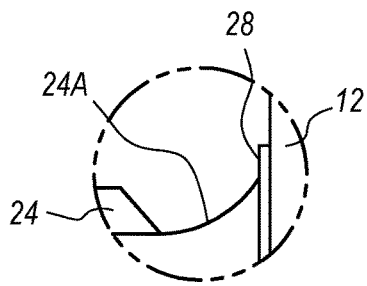
FIG. 17A is an enlarged view of a portion of FIG. 17 showing a flexible conductive filament extending from an electrical contact on the displacement member (not shown) to engage a stationary electrical contact on the body.

FIG. 17A is an enlarged view of a portion of FIG. 17 showing a flexible conductive filament 24A extending from an electrical contact 28 on the displacement member (not shown) to engage a stationary electrical contact 28 on the body 12. It will be understood that, once the switch 65 is moved to the closed position (shown in FIG. 18) to energize the circuit 46, the flexible conductive filament 24A remains conductively engaged with the "L"-shaped stationary electrical contact 28 on the body 12 as the displacement member 20 is moved in the direction of arrow 50 relative to the body 12.

FIG. 18 is the plan view of the apparatus 10 of FIG. 17 after the blood sample 30 partially coagulates and contracts to form a partially coagulated blood sample 30A. The partially coagulated blood sample 30A partially contracts within the cavity 14 and it adheres to the wetted portion 22 of the displacement member 20 and moves the displacement member 20 towards, but not to, the position of the displacement member 20 shown in FIG. 19 as the blood sample 30 contacts. The conductive spring element 40A is shown in FIG. 18 as being mechanically deformed (elongated) due to movement of the distal end 40B with the displacement member 20, but the circuit 46 remains closed because the deformed conductive spring element 40A remains intact and the flexible conductive filament 24A remains in conductive engagement with the "L"-shaped stationary electrical contact 24, and the signal indicator 42 remains activated. The deformed conductive spring element 40A is adapted to rupture upon displacement of the displacement member 20 by an amount that correlates to a predetermined capacity to clot being exhibited by the blood sample 30 introduced into the cavity 14 of the apparatus 10.

FIG. 19 is the plan view of the apparatus 10 of FIG. 18 after the displacement member 20 is displaced a sufficient amount by contraction and coagulation of the blood sample 30A introduced into the cavity 14 of the apparatus 10 to cause rupture of the deformed conductive spring element 40A. The location 68 of the rupture of the deformed spring element 40A is indicated in FIG. 19 as being proximal the midsection of the spring element 40A but can occur at other locations. The signal generator 42A is shown as being deactivated as a result of the electrical circuit 46 being opened by rupture of the spring element 40A to indicate to the user of the apparatus 10 a condition of the blood sample introduced into the cavity 14.

FIG. 20 is a plan view of an embodiment of an apparatus 10 of the present invention having an interruptible optical discrete indicator for alerting the user to a condition of a blood sample 30. The embodiment of the apparatus 10 of FIG. 20 includes, like that of FIGS. 3 and 4, a body 12, a cavity 14 on the body 12 to receive a blood sample 30, a displacement member 20 movable on the body 12 between a first position, shown in FIG. 20, and a second position shown in FIG. 21. The displacement member 20 includes a wetted portion 22 forming a portion of a wall 16 that surrounds the cavity 14 and the blood sample 30 introduced therein. The apparatus 10 of FIG. 20 includes spring element 40 disposed intermediate the body 12 and the displacement member 20 to bias the displacement member 20 against movement from the first position to the second position.

The apparatus 10 further includes a light source 41 such as, for example, but not by way of limitation, an ambient light entry port or an energizable light source such as an LED (light emitting diode) powered by a battery or a photovoltaic device 44 (as previously discussed above in relation to FIGS. 1 and 2). An ambient light entry port light source 41 includes a highly reflective interior open to a first light pathway segment 43 in the body 12 of the apparatus 10. The first light pathway segment 43 is aligned with, but separated from, a second light pathway segment 47 in the body 12 of the apparatus 10. The second light pathway segment 47 is open to a visually detectable signal generator 45 that is illuminated when light enters the second light pathway segment 47. The first light pathway segment 43 is in optical communication with the second light pathway segment 47 by way of a movable light pathway segment 27 of the displacement member 20 when the displacement member 20 is in the first position illustrated in FIG. 20. In this position, light is transmitted from the light source 41 to illuminate the signal generator 45. Sufficient movement of the displacement member 20 will move the light pathway segment 27 from the aligned position shown in FIG. 20 to a misaligned position.

FIG. 21 is the plan view of the apparatus 10 of FIG. 3 after a blood sample is introduced into the cavity 14 in the body 12 of the apparatus 10 for testing. The blood sample coagulates and contracts to form a coagulated blood sample 30A as shown in FIG. 21. The coagulated and clotted blood sample 30A adheres to the wetted portion 22 of the displacement member 20 as it contracts, and a displacing force imparted to the displacement member 20 by the coagulating blood sample 30A moves the displacement member 20 to misalign the movable light pathway segment 27 on the displacement member 20 with the first light pathway segment 43 and the second light pathway segment 47 on the body 12. This misalignment blocks the light emitted by the light source 41 (either an ambient light entry port or an energizable light source) into the first light pathway segment 43 from passing through the movable light pathway segment 27 to the aligned second light pathway segment 47, thereby terminating illumination of the signal generator 45 to indicate to the user to a condition of the blood sample.

Like the embodiment discussed in connection with FIGS. 3 and 4, it will be understood that one or more of the first light pathway segment 43, the movable light pathway segment 27 and the second light pathway segment 47 may, in some embodiments, contain optical transmission medium such as, for example, glass or optical fiber(s) to transmit light from the light source 41 to the signal generator 45. Alternately, or in addition, the walls of one or more of the first light pathway segment 43, the movable light pathway segment 27 and the second light pathway segment 47 may be highly reflective to deter loss of light by absorption, thus enhancing the extent to which light from the light source 41 is delivered to illuminate the signal generator 45.

Figure 22:
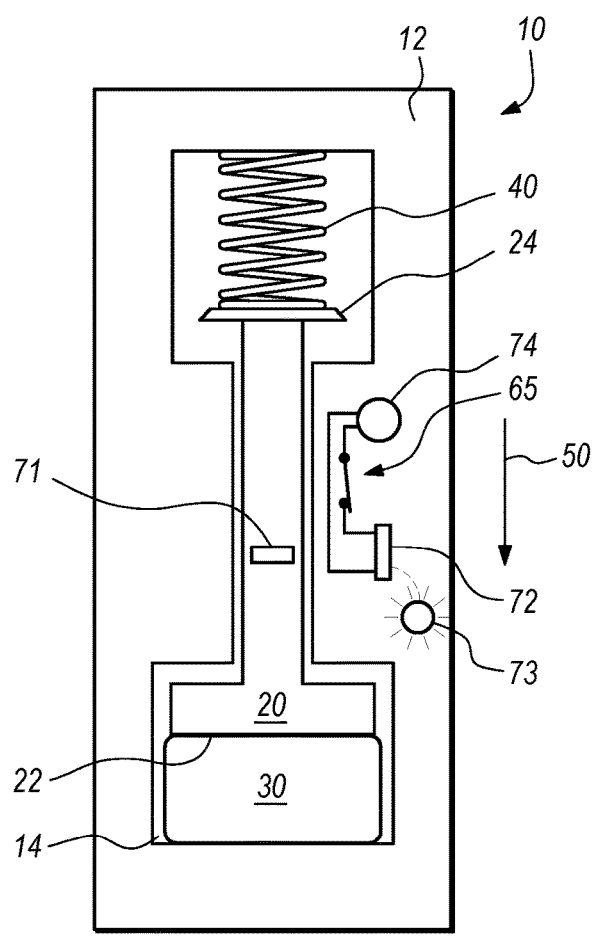
FIG. 22 is a plan view of an embodiment of an apparatus of the present invention having a discrete indicator having an interruptible Hall effect sensor as a switch for alerting the user to a condition of a blood sample.
Figure 23:
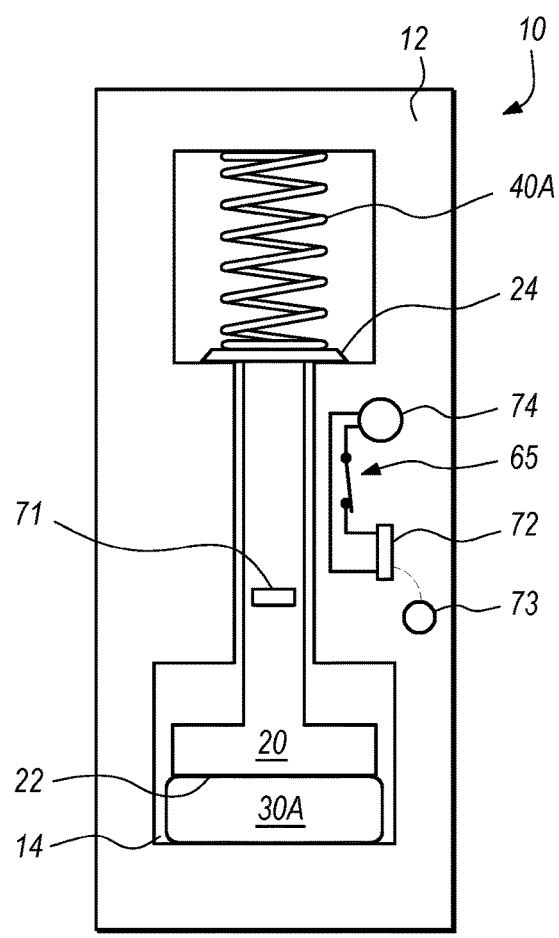
FIG. 23 is the plan view of the apparatus of FIG. 22 after the blood sample coagulates and contracts to form a coagulated blood sample to interrupt the Hall effect sensor to thereby indicate to the user a condition of the blood sample.

FIG. 22 is a plan view of an embodiment of an apparatus 10 of the present invention having a discrete indicator having an interruptible Hall effect sensor as a switch for alerting the user to a condition of a blood sample, the embodiment of the apparatus 10 having a body 12 with a cavity 14 in the body 12 to receive a blood sample 30, a displacement member 20 movable relative to the body 12 from a first position illustrated in FIG. 22 to a second position illustrated in FIG. 23. The displacement member 20 of the apparatus 10 includes a wetted portion 22 that forms a portion of a wall 16 that surrounds the cavity 14 and the blood sample 30 introduced therein. The apparatus 10 of FIG. 22 includes spring element 40 disposed intermediate the body 12 and the displacement member 20 to bias the displacement member 20 against movement from the first position to the second position. The apparatus 10 further includes a position sensor 72 disposed on the body 12 spaced apart from a magnet 71 that is disposed on and moves with the displacement member 20. A switch 65 is provided to enable the position sensor 72 to be energized prior to the introduction of the blood sample 30 into the cavity 14 if the magnet 71 is sufficiently proximal to the position sensor 72. After introduction of the blood sample 30 into the cavity 14, contraction of the blood sample 30 upon coagulation causes the displacement member 20 to move downwardly in the direction of arrow 50 and, if the distance over which the displacement member 20 moves is sufficient, positions the magnet 71 distal to the position sensor 72 to extinguish the signal at the signal generator 73 as shown in FIG. 23.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiments illustrated herein were chosen and described to best explain the principles of the invention and the practical application, and to enable others of ordinary skill in the art to understand the invention for various embodiments with various modifications as are suited to the particular use contemplated. The scope of the invention is limited only by the claims that follow.

We claim:

1. An apparatus, comprising:
   a body having a cavity with a wall to receive a sample of blood obtained from a patient for testing;
   a displacement member movably received on the body, the displacement member movable through a distance on the body from a first position to a second position, the displacement member having a wetted portion thereon forming a wall portion that, together with the wall of the cavity, surrounds a blood sample introduced into the cavity;
   a spring element connected intermediate the displacement member and the body to bias the displacement member against movement from the first position;
   an indicator having a signal generator, a first portion on the body and a second portion on the displacement member, the second portion of the indicator being at least one of engaged with and aligned with the first portion of the indicator with the displacement member in the second position to produce a signal from the signal generator indicating movement of the displacement member to the second position; and
   a channel on the body having a first wall and a second wall opposite the first wall, the displacement member being movably received therebetween;
   wherein the introduction of the blood sample into the cavity of the body causes the blood sample to clot and to adhere to the wetted portion of the displacement member as it contracts within the cavity thereby resulting in displacement of the displacement member towards the second position;
   wherein the at least one of engagement and alignment of the second portion of the indicator on the displacement member with the first portion of the indicator on the body produces a signal indicating a condition of the blood sample;
   wherein the signal generator produces at least one of a visually detectable signal, a tactile signal and an audibly detectable signal upon the second portion of the indicator being at least one of engaged with and aligned with the first portion of the indicator with the displacement member in the second position;
   wherein the first portion of the indicator includes a body optical pathway first segment in the first wall of the channel and an aligned body optical pathway second segment in the second wall of the channel, the body optical pathway second segment being aligned with the body optical pathway first segment;
   wherein the second portion of the indicator includes a displacement member optical pathway segment in the displacement member;
   wherein the body optical pathway first segment, the body optical pathway second segment and the displacement member optical pathway segment become aligned upon movement of the displacement member to the second position;
   wherein said alignment provides a segmented optical pathway allowing for a light signal to be transmitted from a light source on the body towards the signal generator;
   wherein the light source on the body is in optical communication with the body optical pathway first segment; and
   wherein the signal generator is in optical communication with the body optical pathway second segment.

2. The apparatus of claim 1, wherein the spring constant of the spring element and the distance over which the displacement member moves from the first position to the second position are together selected to require a known amount of work to be imparted to the displacement member by the clotting blood sample for the displacement member to be moved to the second position; and
   the known amount of work is correlated to a predetermined clotting capacity of the blood sample introduced into the cavity.

3. The apparatus of claim 1, wherein the first portion of the indicator includes an optical pathway first segment;
   wherein the second portion of the indicator includes an optical pathway second segment; and
   wherein alignment of the first portion of the indicator with the second portion of the indicator provides an optical pathway to transmit a visually detectable signal from one of the optical pathway first segment and optical pathway second segment to the other of the optical pathway first segment and optical pathway second segment.

4. The apparatus of claim 3, wherein at least one of the optical pathway first segment and the optical pathway second segment comprises an optically conductive medium including at least one of an optical transmission fiber, a photonic crystal waveguide, a variable diffraction grating and glass.

5. The apparatus of claim 1, further comprising:
   a channel on the body to movably receive the displacement member.

6. The apparatus of claim 1, wherein the first portion on the body includes a deformable member;
   wherein the second portion on the displacement member includes a traveling member that moves with the displacement member;
   wherein the deformable member is in the pathway of the traveling member as the displacement member moves from the first position to the second position on the body;
   wherein upon introduction of a blood sample into the cavity of the body and subsequent contraction of the blood sample due to coagulation moves the displacement member from the first position to the second position and moves the traveling member to engage and deform the deformable member to provide the visually detectable signal.

7. An apparatus, comprising:
   a body having a cavity with a wall to receive a sample of blood obtained from a patient for testing;
   a displacement member movably received on the body, the displacement member movable through a distance on the body from a first position to a second position, the displacement member having a wetted portion thereon forming a wall portion that, together with the wall of the cavity, surrounds a blood sample introduced into the cavity;

a spring element connected intermediate the displacement member and the body to bias the displacement member against movement from the first position;

an indicator having a signal generator, a first portion on the body and the second portion on the displacement member, the second portion of the indicator being at least one of engaged with and aligned with the first portion of the indicator with the displacement member in the second position to produce a signal from the signal generator indicating movement of the displacement member to the second position;

wherein the introduction of the blood sample into the cavity of the body causes the blood sample to clot and to adhere to the wetted portion of the displacement member as is contracts within the cavity thereby resulting in displacement of the displacement member towards the second position;

wherein the at least one of engagement and alignment of the second portion of the indicator on the displacement member with the first portion of the indicator on the body produces a signal indicating a condition of the blood sample; and wherein the signal generator produces at least one of a visually detectable signal, a tactile signal and an audibly detectable signal upon the second portion of the indicator being at least one of engaged with and aligned with the first portion of the indicator with the displacement member in the second position, further comprising:

one of a battery and a photovoltaic cell; and wherein the first portion of the indicator on the body includes an open electrical circuit with one of the battery and the photovoltaic cell coupled in series with the signal generator, the open electrical circuit having a gap therein proximal to the displacement member;

wherein upon movement to the second position relative to the body the second portion of the indicator on the displacement member conductively engages the first portion of the indicator on the body to close the gap in the open electrical circuit to complete the electrical circuit and to thereby deliver current from the one of the battery and the photovoltaic cell to the signal generator to activate the signal generator.

8. The apparatus of claim 7, wherein upon activation the signal generator produces at least one of the visually detectable signal, the tactile signal and the audibly detectable signal.

9. The apparatus of claim 8, wherein the signal generator produces the visually detectable signal upon activation; and
wherein the visually detectable signal is one of a light emitting diode and a liquid crystal display.

10. The apparatus of claim 8, wherein the signal generator produces the tactile signal upon activation.

11. An apparatus, comprising:
a body having a cavity with a wall to receive a sample of blood obtained from a patient for testing;
a displacement member movably received on the body, the displacement member movable through a distance on the body from a first position to a second position, the displacement member having a wetted portion thereon forming a wall portion that, together with the wall of the cavity, surrounds a blood sample introduced into the cavity;
a spring element connected intermediate the displacement member and the body to bias the displacement member against movement from the first position;
an indicator having a signal generator, a first portion on the body and the second portion on the displacement member, the second portion of the indicator being at least one of engaged with and aligned with the first portion of the indicator with the displacement member in the second position to produce a signal from the signal generator indicating movement of the displacement member to the second position;
wherein the introduction of the blood sample into the cavity of the body causes the blood sample to clot and to adhere to the wetted portion of the displacement member as is contracts within the cavity thereby resulting in displacement of the displacement member towards the second position;
wherein the at least one of engagement and alignment of the second portion of the indicator on the displacement member with the first portion of the indicator on the body produces a signal indicating a condition of the blood sample; and
wherein the signal generator produces at least one of a visually detectable signal, a tactile signal and an audibly detectable signal upon the second portion of the indicator being at least one of engaged with and aligned with the first portion of the indicator with the displacement member in the second position, further comprising:
a channel on the body to movably receive the displacement member, wherein the first portion of the indicator includes a recess in a wall of the channel on the body; and
wherein the second portion of the indicator includes a recess in the displacement member that is misaligned with the recess in the wall of the channel on the body with the displacement member in the first position, a push member received within the recess on the displacement member and a second spring element disposed intermediate the push member and the displacement member to bias the push member against the wall of the channel on the body with the displacement member in the first position; and
wherein upon movement of the displacement member to the second position, the recess on the displacement member aligns with the recess in the wall of the channel on the body and the push member is displaced by the spring element from the recess on the displacement member.

12. The apparatus of claim 11, wherein the push member includes a rolling element to reduce frictional resistance to movement of the displacement member within the channel of the body.

13. An apparatus, comprising:
a body having a cavity with a wall to receive a sample of blood obtained from a patient for testing;
a displacement member movably received on the body, the displacement member movable through a distance on the body from a first position to a second position, the displacement member having a wetted portion thereon forming a wall portion that, together with the wall of the cavity, surrounds a blood sample introduced into the cavity;
a spring element connected intermediate the displacement member and the body to bias the displacement member against movement from the first position;
an indicator having a signal generator, a first portion on the body and the second portion on the displacement member, the second portion of the indicator being at least one of engaged with and aligned with the first portion of the indicator with the displacement member in the second position to produce a signal from the signal generator indicating movement of the displacement member to the second position;

wherein the introduction of the blood sample into the cavity of the body causes the blood sample to clot and to adhere to the wetted portion of the displacement member as is contracts within the cavity thereby resulting in displacement of the displacement member towards the second position;

wherein the at least one of engagement and alignment of the second portion of the indicator on the displacement member with the first portion of the indicator on the body produces a signal indicating a condition of the blood sample; and wherein the signal generator produces at least one of a visually detectable signal, a tactile signal and an audibly detectable signal upon the second portion of the indicator being at least one of engaged with and aligned with the first portion of the indicator with the displacement member in the second position, wherein the first portion of the indicator on the body includes a first chemical agent;

wherein the second portion of the indicator on the body includes a second chemical agent that is reactive with the first chemical agent; and wherein upon movement of the displacement member to the second position, the first chemical agent engages the second chemical agent to produce at least one of an exothermic reaction and a chemiluminescent reaction.

14. The apparatus of claim 13, wherein the signal generator comprises:
a heat-sensitive material that exhibits a change in color upon exposure to heat, the heat-sensitive material being proximal to one of the first portion and the second portion of the indicator;
wherein engagement of the first chemical agent with the second chemical agent produces an exothermic reaction that heats the heat-sensitive material and produces the visually detectable signal in the form of a change in the color of the heat-sensitive material.

15. The apparatus of claim 13, wherein the signal generator comprises the light produced as a result of the visually detectable chemiluminescent reaction between the first chemical agent and the second chemical agent.

16. An apparatus, comprising:
a body having a cavity with a wall to receive a sample of blood obtained from a patient for testing and a field effect transistor as a position sensor, the body further including a source dopant, a drain dopant, a reverse polarity dopant disposed
intermediate the source dopant and the drain dopant, a source metal electrode adjacent the source dopant, a drain metal electrode adjacent to the drain dopant, an oxide/dielectric member disposed intermediate the source dopant and the drain dopant and proximal to the reverse polarity dopant, a circuit coupled in series to the source dopant and the drain dopant with a battery and a signal generator disposed therebetween;
a displacement member movably received on the body, the displacement member having a gate movable with the displacement member through a distance on the body from a first position to a second position, the displacement member having a wetted portion thereon forming a wall portion that, together with the wall of the cavity, surrounds a blood sample introduced into the cavity;
a spring element connected intermediate the displacement member and the body to bias the displacement member against movement from the first position; and
an indicator having a signal generator coupled to the position sensor to produce one of the visually detectable signal, the tactile signal and the audible signal upon the gate being moved to the second position proximal to the position sensor;
wherein the conductivity between the drain metal electrode and the source metal electrode is controlled by an electric field which is generated by the voltage difference between the body and the gate on the displacement member;
wherein the gate being distal to the reverse polarity dopant on the body results in a very low conductivity within the circuit between the drain metal electrode and the source metal electrode;
wherein movement of the gate to a position that is proximal to the reverse polarity dopant and intermediate the source metal electrode and the drain metal electrode to substantially increase the conductivity within the circuit between the drain metal electrode and the source metal electrode to provide sufficient current from the battery to the signal generator to produce the one of a visually detectable signal, a tactile signal and an audible signal; and
wherein the introduction of the blood sample into the cavity of the body causes the blood sample to clot and to adhere to the wetted portion of the displacement member as it contracts within the cavity thereby resulting in displacement of the displacement member to the second position and movement of the gate thereon to the position proximal to the reverse polarity dopant to produce the one of a visually detectable signal, a tactile signal and an audible signal.

17. An apparatus, comprising:
a body having a cavity with a wall to receive a sample of blood obtained from a patient for testing;
a displacement member movably received on the body, the displacement member movable through a distance on the body from a first position to a second position, the displacement member having a wetted portion thereon forming a wall portion that, together with the wall of the cavity, surrounds a blood sample introduced into the cavity;
a spring element connected intermediate the displacement member and the body to bias the displacement member against movement from the first position;
an indicator having a signal generator, a first portion on the body and a second portion on the displacement member, the second portion of the indicator being at least one of engaged with and aligned with the first portion of the indicator with the displacement member in the second position to produce a signal from the signal generator indicating movement of the displacement member to the second position;
wherein the introduction of the blood sample into the cavity of the body causes the blood sample to clot and to adhere to the wetted portion of the displacement member as it contracts within the cavity thereby resulting in displacement of the displacement member towards the second position;
wherein the at least one of engagement and alignment of the second portion of the indicator on the displacement member with the first portion of the indicator on the body produces a signal indicating a condition of the blood sample; and wherein the signal generator produces at least one of a visually detectable signal, a tactile signal and an audibly detectable signal upon the second portion of the indicator being at least one of engaged with an aligned with the first portion of the indicator with the displacement member in the second position, wherein the first portion of the indicator includes a circuit, the circuit being coupled to a first chemical chamber on the body and an aligned second chemical chamber on the body, a volume of a first reactant chemical in the first chemical chamber and a volume of a second reactant chemical electrochemically reactive with the first reactant chemical in the first chemical chamber;

wherein the displacement member is movably disposed intermediate the first chemical chamber and the second chemical chamber of the body to isolate the first reactant chemical from the second reactant chemical with the displacement member in the first position;

wherein the second portion of the indicator on the displacement member includes a porous membrane that is misaligned with both the first chemical chamber and the second chemical chamber with the displacement member in the first position to isolate the porous membrane from the first reactant chemical and the second reactant chemical and aligned with the first reactant chamber and the second reactant chamber with the displacement member in the second position to expose the porous membrane to the first reactant chemical and the second reactant chemical; and wherein contraction of a blood sample introduced into the cavity of the body moves the displacement member relative to the body to the second position and aligns the second portion of the indicator on the displacement member with the first portion of the indicator on the body to thereby place the first reactant chemical in electrochemical engagement with the second reactant chemical;

wherein electrochemical engagement of the first reactant chemical and the second reactant chemical results in an electrochemical reaction between the first reactant chemical and the second reactant chemical and produces an electrical current in the circuit that activates the signal generator and produces one of a visually detectable signal, a tactile signal and an audibly detectable signal.

\* \* \* \* \*